United States Patent
Yahata et al.

(10) Patent No.: US 9,852,775 B2
(45) Date of Patent: Dec. 26, 2017

(54) RECORDING MEDIUM, PLAYBACK DEVICE, AND PLAYBACK METHOD

(71) Applicant: Panasonic Intellectual Property Corporation of America, Torrance, CA (US)

(72) Inventors: Hiroshi Yahata, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/279,539

(22) Filed: Sep. 29, 2016

(65) Prior Publication Data

US 2017/0018292 A1    Jan. 19, 2017

Related U.S. Application Data

(63) Continuation of application No. PCT/JP2015/004185, filed on Aug. 21, 2015.
(Continued)

(30) Foreign Application Priority Data

Jul. 9, 2015    (JP) .................................. 2015-138166

(51) Int. Cl.
*H04N 5/92*    (2006.01)
*H04N 5/917*    (2006.01)
(Continued)

(52) U.S. Cl.
CPC .............. *G11B 27/28* (2013.01); *G11B 20/10* (2013.01); *G11B 27/105* (2013.01);
(Continued)

(58) Field of Classification Search
USPC ............... 386/326, 331, 335, 336, 338, 232; 348/42, 43
See application file for complete search history.

(56) References Cited

U.S. PATENT DOCUMENTS

| 6,088,506 A | 7/2000 | Yoshio et al. |
| 2013/0011117 A1 | 1/2013 | Hamada |
| (Continued) | | |

FOREIGN PATENT DOCUMENTS

| EP | 3013040 A1 | 4/2016 |
| EP | 3016378 A1 | 5/2016 |
| (Continued) | | |

OTHER PUBLICATIONS

International Search Report of PCT application No. PCT/JP2015/004185 dated Nov. 10, 2015.
(Continued)

*Primary Examiner* — Daquan Zhao
(74) *Attorney, Agent, or Firm* — Greenblum & Bernstein, P.L.C.

(57) ABSTRACT

At least one video stream that is encoded video information, and a management information file indicating attributes relating to the entire recording medium, are recorded in a recording medium. The management information file includes attribute information indicating whether the dynamic range of luminance of an initial video stream, which is played first out of the at least one video stream when the recording medium is inserted into a playback device, is a first dynamic range, or a second dynamic range that is broader than the first dynamic range.

8 Claims, 44 Drawing Sheets

Related U.S. Application Data

(60) Provisional application No. 62/049,660, filed on Sep. 12, 2014.

(51) Int. Cl.

| | | |
|---|---|---|
| *H04N 5/89* | (2006.01) | |
| *G11B 27/28* | (2006.01) | |
| *G11B 20/10* | (2006.01) | |
| *G11B 27/10* | (2006.01) | |
| *G11B 27/32* | (2006.01) | |
| *H04N 5/85* | (2006.01) | |
| *H04N 7/015* | (2006.01) | |
| *H04N 9/804* | (2006.01) | |
| *H04N 9/82* | (2006.01) | |
| *H04N 5/765* | (2006.01) | |
| *H04N 13/00* | (2006.01) | |

(52) U.S. Cl.
CPC ............ *G11B 27/329* (2013.01); *H04N 5/85* (2013.01); *H04N 7/015* (2013.01); *H04N 9/8042* (2013.01); *H04N 9/8205* (2013.01); *G11B 2220/2541* (2013.01); *G11B 2220/2562* (2013.01)

(56) References Cited

U.S. PATENT DOCUMENTS

| | | | |
|---|---|---|---|
| 2014/0056577 A1 | 2/2014 | Ogawa et al. | |
| 2014/0123183 A1* | 5/2014 | Fujimoto | H04N 5/4403 725/37 |
| 2014/0225941 A1 | 8/2014 | Van der Vleuten et al. | |
| 2016/0134832 A1 | 5/2016 | Yamamoto et al. | |
| 2016/0173845 A1 | 6/2016 | Uchimura et al. | |
| 2016/0189409 A1 | 6/2016 | Aiba et al. | |
| 2016/0301907 A1 | 10/2016 | Uchimura et al. | |

FOREIGN PATENT DOCUMENTS

| | | |
|---|---|---|
| EP | 3107100 A1 | 12/2016 |
| EP | 3196881 A1 | 7/2017 |
| JP | 9-282848 | 10/1997 |
| WO | 2011/125572 | 10/2011 |
| WO | 2012/147350 | 11/2012 |
| WO | 2013/046096 | 4/2013 |
| WO | 2014/203746 A1 | 12/2014 |
| WO | 2014/208345 A1 | 12/2014 |
| WO | 2015/007910 A1 | 1/2015 |
| WO | 2016/038950 A1 | 3/2016 |
| WO | 2016/039172 A1 | 3/2016 |

OTHER PUBLICATIONS

The Extended European Search Report dated Jul. 3, 2017 from the European Patent Office (EPO) for the related European Patent Application No. 15840536.5.

Communication pursuant to Rule 164(1) EPC dated Mar. 17, 2017 from the European Patent Office (EPO) for the European Patent Application No. 15840536.5.

\* cited by examiner

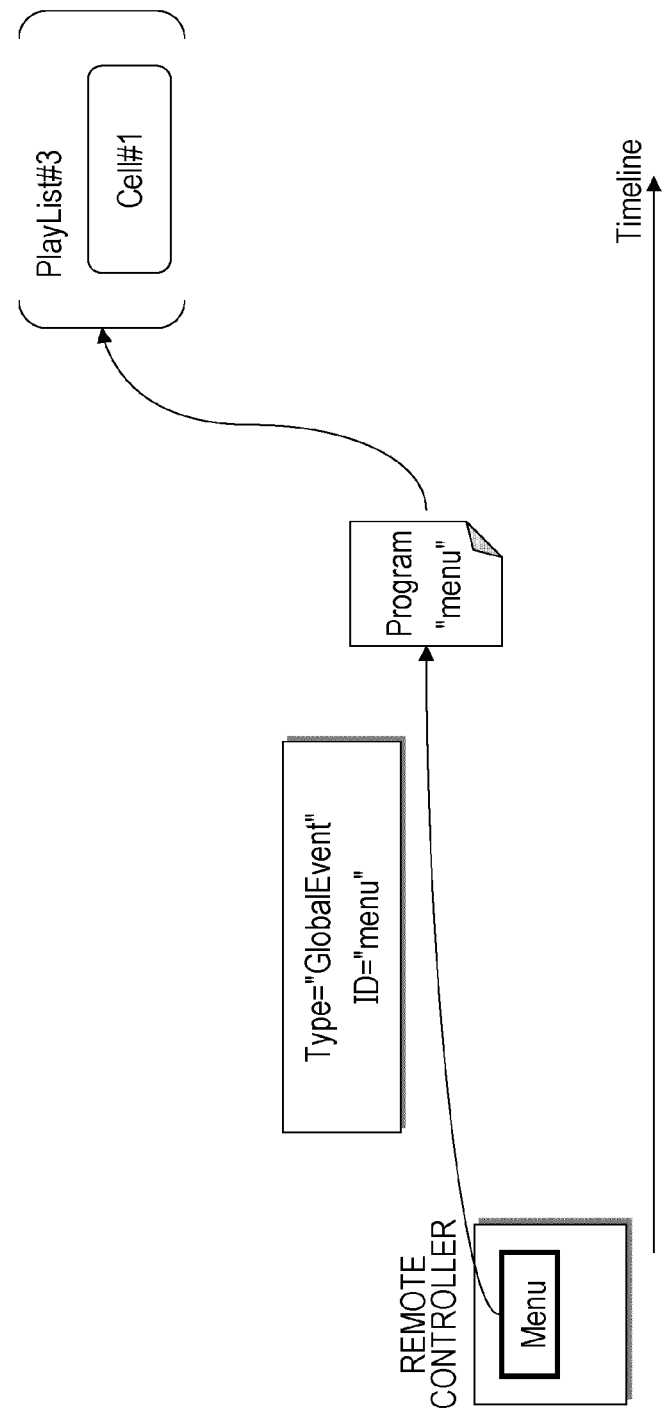

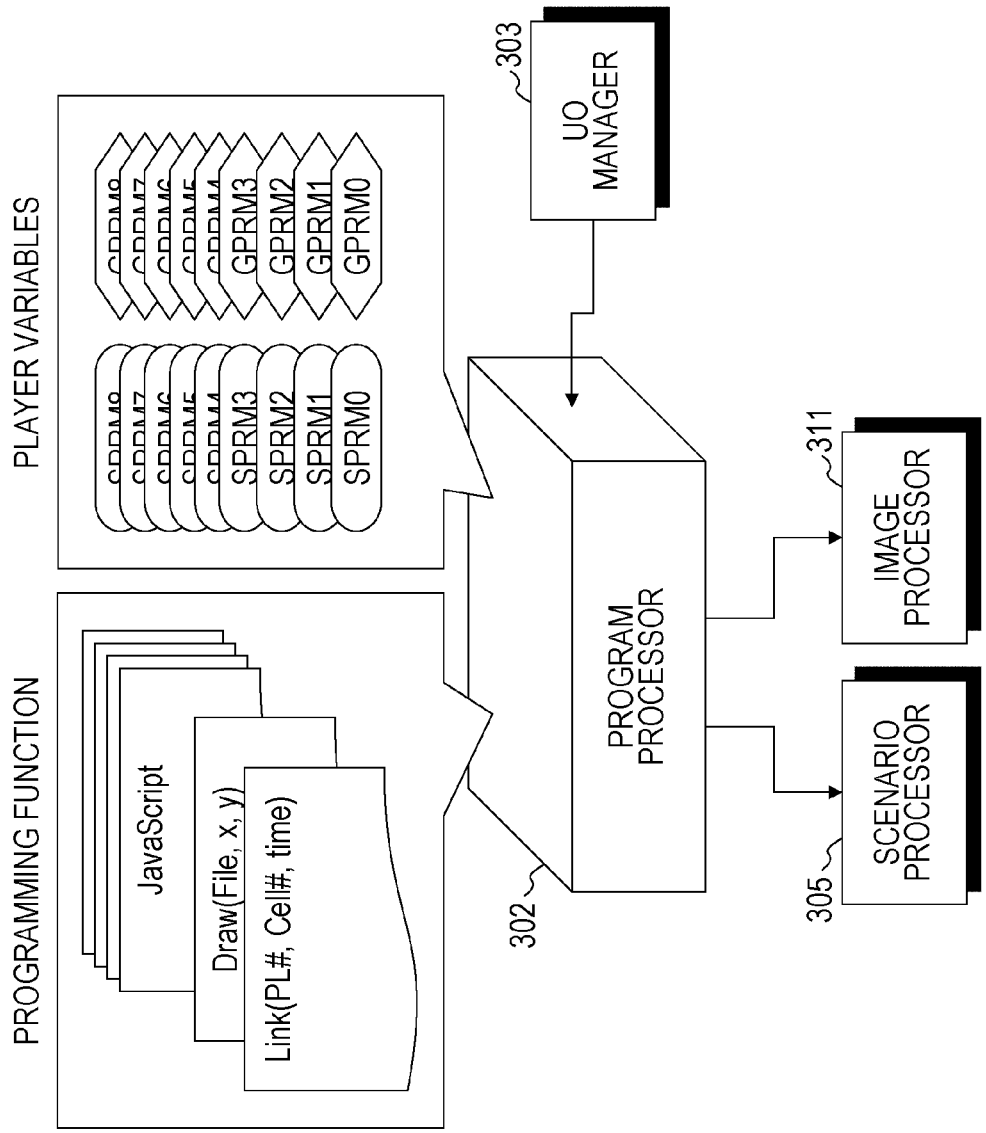

FIG. 24

----PLAYER VARIABLES (SYSTEM PARAMETERS)----

| 0 | Language Code | 11 | Player audio mixing mode for Karaoke | 22 | reserved |
| --- | --- | --- | --- | --- | --- |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

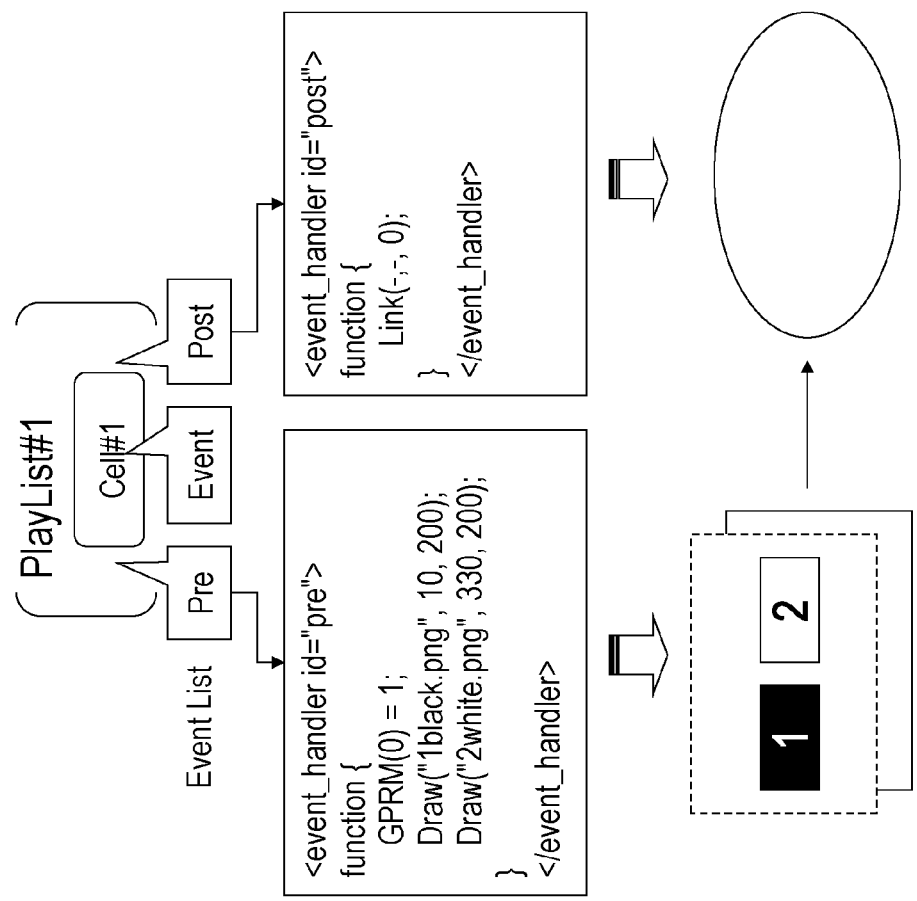

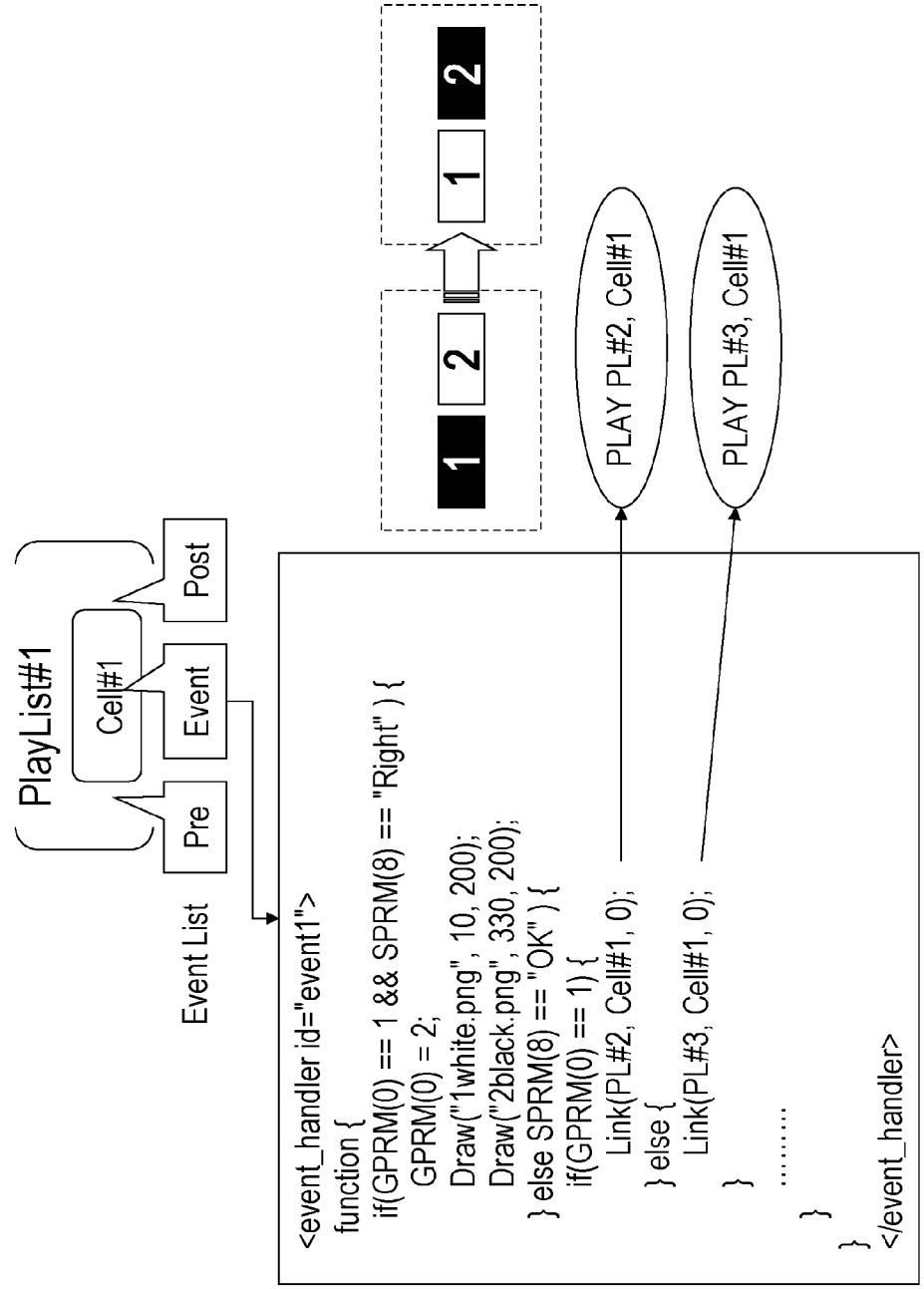

RECORDING MEDIUM, PLAYBACK DEVICE, AND PLAYBACK METHOD

BACKGROUND

1. Technical Field

The present invention relates to a recording medium in which is recorded an encoded video stream, a playback device that plays the video stream, and a playback method.

2. Description of the Related Art

Technology relating to DVDs has conventionally been disclosed (e.g., Japanese Unexamined Patent Application Publication No. 9-282848). However, further improvement was needed with this technology.

SUMMARY

In one general aspect, the techniques disclosed here feature a recording medium, in which are recorded at least one video stream that is encoded video information, and a management information file indicating attributes relating to the entire recording medium. The management information file includes attribute information indicating whether the dynamic range of luminance of an initial video stream, which is played first out of the at least one video stream when the recording medium is inserted into a playback device, is a first dynamic range, or a second dynamic range that is broader than the first dynamic range.

According to the above configuration, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 22 is a diagram illustrating an example of a global event;

FIG. 23 is a diagram for describing the functional configuration of a program processor;

FIG. 24 is a diagram illustrating a list of system parameters (SPRM);

FIG. 25 is a diagram illustrating an example of a program in an event handler according to control of a menu screen having two selection buttons;

FIG. 26 is a diagram illustrating an example of a program in an event handler relating to a menu selection user event;

DETAILED DESCRIPTION

Underlying Knowledge Forming Basis of the Present Invention

The present Inventors found that the following problem occurs relating to the recording media such as DVD and the like described in the "Background Art" section.

Most representative of information recording media recording video data is the DVD (hereinafter, may also be referred to as "Standard Definition" (SD)-DVD). A conventional DVD will be described below.

Figure 1:
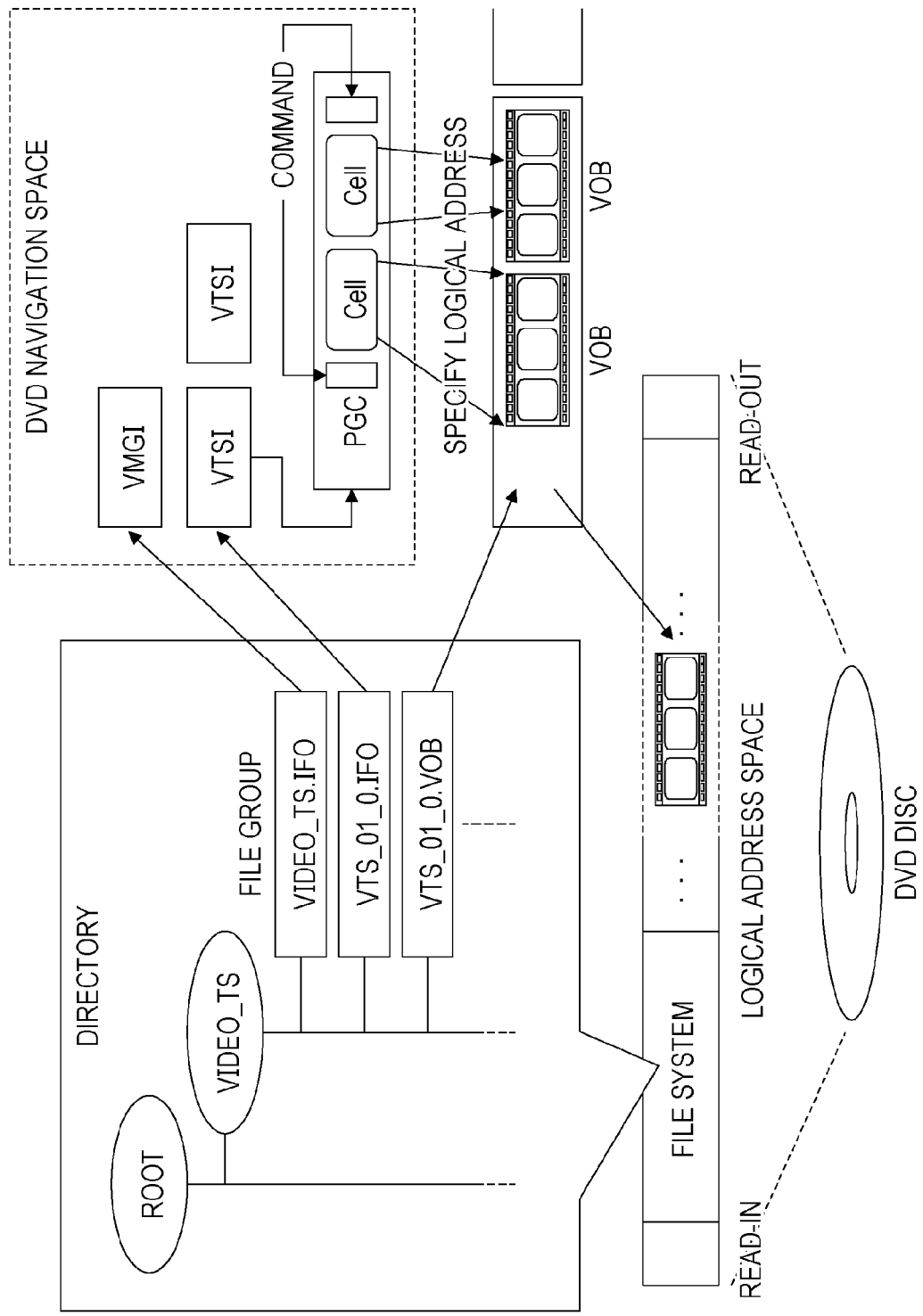
FIG. 1 is a diagram illustrating an SD-DVD structure.

FIG. 1 is a diagram illustrating the structure of an SD-DVD. As shown in the lower tier in FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files. There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

| | |
|---|---|
| VIDEO_TS.IFO | Disc play control information file |
| VTS_01_0.IFO | Video title set #1 play control information file |
| VTS_01_0.VOB | Video title set #1 stream file |
| ... | |

As shown in the above example, two suffixes are stipulated. "IFO" is a suffix indicating that the file has play control information recorded therein, and "VOB" is a suffix indicating that the file has an MPEG stream, which is AV data, recorded therein.

Play control information is information attached to the AV data, such as information to realize interactivity employed with the DVD (technology to dynamically change playing in response to user operations), metadata, and so forth. Play control information is commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD. "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programming information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to Java (a registered trademark) Script and so forth executed in browsers to display Web pages, for example. However, while Java (registered trademark) Script performs window or browser control (e.g., opening a new browser window, etc.) besides logical operations, DVD command differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
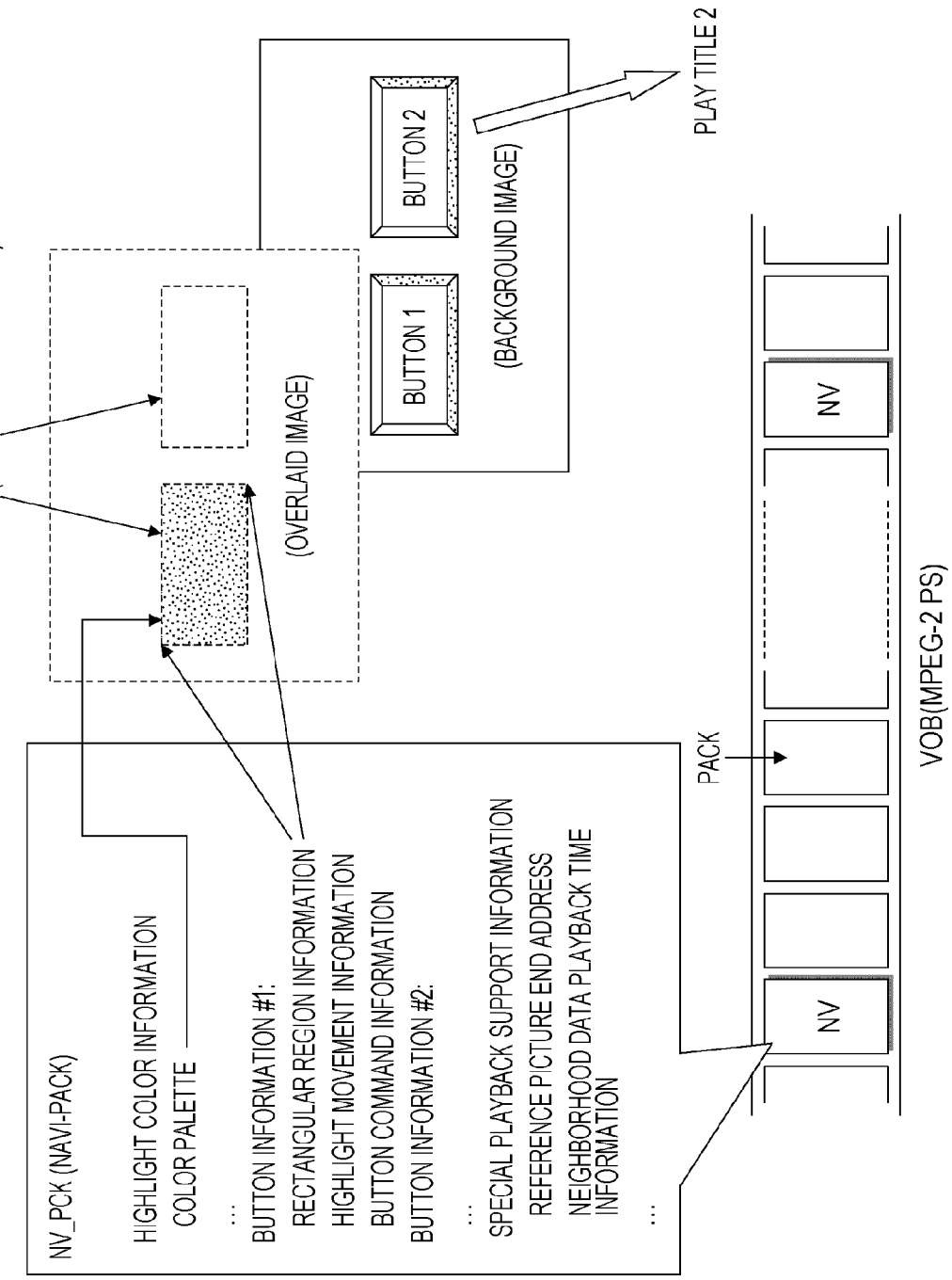
FIG. 2 is a schematic diagram for describing navigation information embedded in an MPEG stream, which is AV data.

FIG. 2 is an overview for describing navigation information embedded in an MPEG stream, which is AV data. Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller. Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows. That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
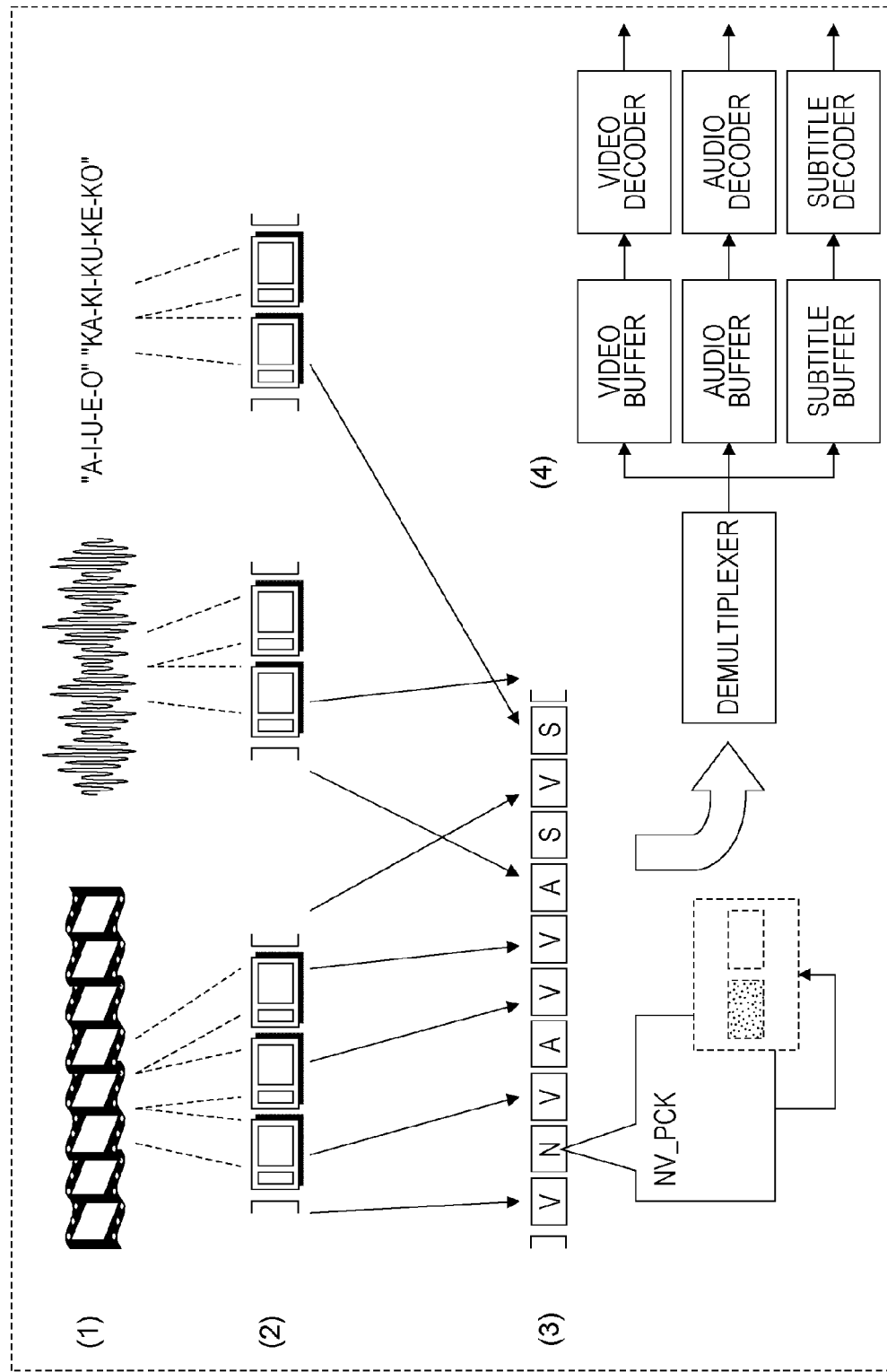
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing. These decoder buffers have different sized according to each of the individual elementary streams, having 232 kB for video, 4 kB for audio, and 52 kB for subtitles. Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same time.

Now, in a large-capacity recording media such as a Blu-ray (registered trademark) disc, there is a possibility that extremely high-definition video information can be stored. Note that Blu-ray (registered trademark) disc, is also called BD or BD-ROM. For example, it is conceivable that video information such as 4K (video information having resolution of 3840×2160 pixels) or HDR (high-luminance video information, generally called High Dynamic Range) may be stored in a BD. However, there are various methods to express luminance including HDR, and there has been no format that can record and manage video information of these realization methods efficiently as a video stream. Accordingly, there is a problem that the playback device cannot suitably express luminance according to the type of video stream recorded in the recording medium such as the BD (the above-described realization method).

The Present Inventors studied the following improvement measures to solve the above problem.

According to an aspect of the present disclosure, in a recording medium are recorded at least one video stream that is encoded video information, and a management information file indicating attributes relating to the entire recording medium. The management information file includes attribute information indicating whether the dynamic range of luminance of an initial video stream, which is played first out of the at least one video stream when the recording medium is inserted into a playback device, is a first dynamic range, or a second dynamic range that is broader than the first dynamic range.

Accordingly, referencing the attribute information in the management information file such as the BD.INFO file (e.g., is_HDR) enables determination of the dynamic range of luminance of the initial video stream. For example, without analyzing the initial video stream. For example, whether the dynamic range of luminance of the initial video stream is SDR or HDR can be easily determined. Thus, when the recording medium is inserted into the playback device, the playback device references the attribute information of the management information file, which enables negotiation based on HDMI (registered trademark) to be speedily performed with a display such as a television or the like, and the initial video stream to be played. In this way, video streams and be efficiently recorded and managed, even in cases where there are various forms for expressing the luminance of video streams.

Also, according to an aspect of the present disclosure, in a recording medium are recorded at least one video stream that is encoded video information, and a management information file indicating attributes relating to the entire recording medium. The management information file includes attribute information indicating whether or not each of a predetermined plurality of types of video streams relating to dynamic range of luminance are included in the at least one video stream.

Accordingly, referencing the attribute information in the management information file in the BD.INFO file (e.g., HDR_type) enables easy determination of what types of video streams are recorded in the BD. That is to say, determination can be made without analyzing the video streams recorded in the BD. For example, determination can be easily made regarding whether or not an SDR video stream, an HDRb video stream, an HDRe video stream, and an enhanced video stream, are recorded in the BD. Thus, the playback device references the attribute information in the management information file, which enables negotiation based on HDMI (registered trademark) to be speedily performed with a display such as a television or the like, and the video streams stored in the BD to be played. In this way, video streams can be efficiently recorded and managed, even in cases where there are various forms for expressing the luminance of video streams.

Also, according to an aspect of the present disclosure, in a recording medium are recorded a base video stream that is encoded video information, an enhanced video stream that is encoded video information, for enhancing luminance of the base video stream, and a management information file in which is described a playback path of the base video stream. A playback path of the enhanced video stream is further described in the management information file so as to be played at the same time as the base video stream. For example, a first section included in the playback path of the base video stream, and a second section included in the playback path of the enhanced video stream, are described in the management information file in a mutually correlated manner, and playback time of the first section and the second section is the same. Specifically, a playback start time of the first section, and a playback start time of the second section, that are the same time as each other, are described in the management information file. Also, a playback end time of the first section, and a playback end time of the second section, that are the same time as each other, are described in the management information file.

Accordingly, not only the playback path of the base video stream (HDR video stream (HDRb)) but also the playback path of the enhanced video stream described as SubPL information can also be easily identified by referencing the management information file such as the PlayList file. Therefore, for example, the playback device can easily and appropriately multiplex the enhanced video stream on the base video stream by referencing the management information file, and consequently can appropriately play video information having a wide dynamic range. In this way, video streams can be efficiently recorded and manages even in cases where there are various forms for expressing luminance of video streams.

The base video stream and the enhanced video stream may be multiplexed in the same transport stream.

Accordingly, the base video stream and enhanced video stream can be clearly correlated, and video information having a wide dynamic range can be played in an appropriate manner.

Also, a playback device according to an aspect of the present disclosure includes a video playback unit that reads out and plays the initial video stream based on the management information file.

Here, the video playback unit may include a first decoding unit that reads out and decodes the base video stream and the enhanced video stream from the recording medium, a second decoding unit that reads out and decodes encoded graphics data from the recording medium, a processing unit that converts color of a predetermined number of levels indicated by the decoded graphics data, into color of a predetermined number of levels in accordance with a video plane that stores a video stream on which the graphics data is to be superimposed, and a superimposing unit that superimposes the decoded enhanced video stream on the decoded base video stream and stores at the video plane, and further superimposes graphics data expressed by color of the converted number of levels on the video stream stored at the video plane.

Accordingly, the playback device according to the present embodiment can make the color of subtitles, for example indicated by graphics data, to appropriately match the color of wide-dynamic-range video information realized using an enhanced video stream.

These general or specific aspects may be realized by a device, method, system, integrated circuit, computer program, or computer-readable recording medium such as a CD-ROM, and may be realized by any combination of a system, method, integrated circuit, computer program, and recording medium.

Preferred embodiments to carry out the present disclosure will be described below with reference to the attached drawings. It should be noted that the second embodiment is the closest embodiment to the disclosure in claim 1 of the present application, but the basic configuration of the information recording medium and so forth in the second embodiment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
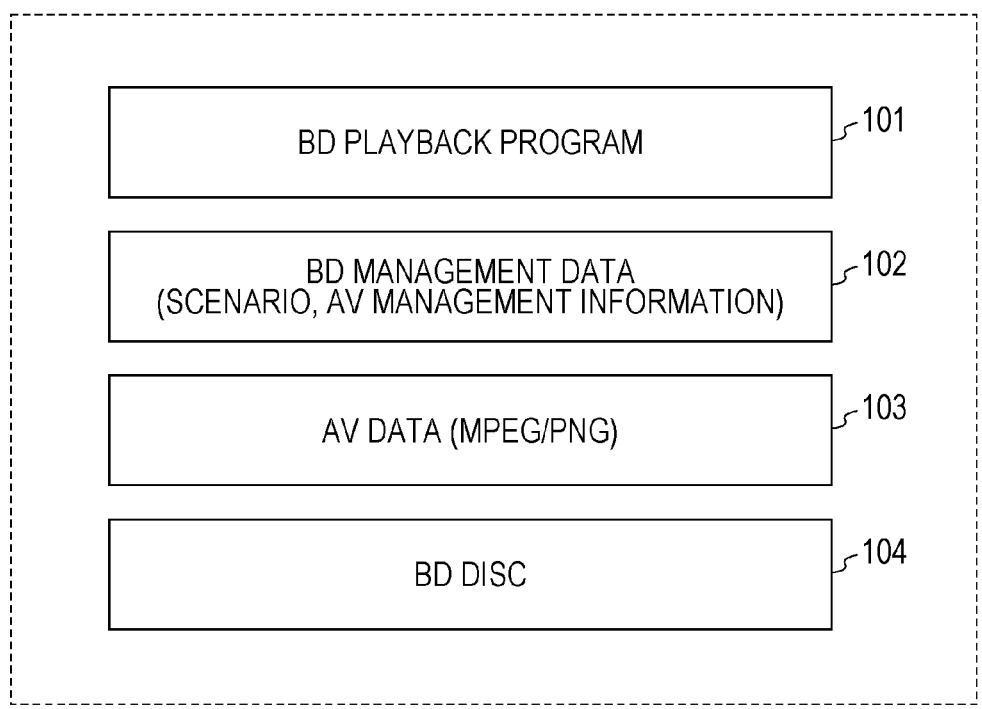
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CD-ROMs and DVD-ROMs, as a matter of course.

Figure 5:
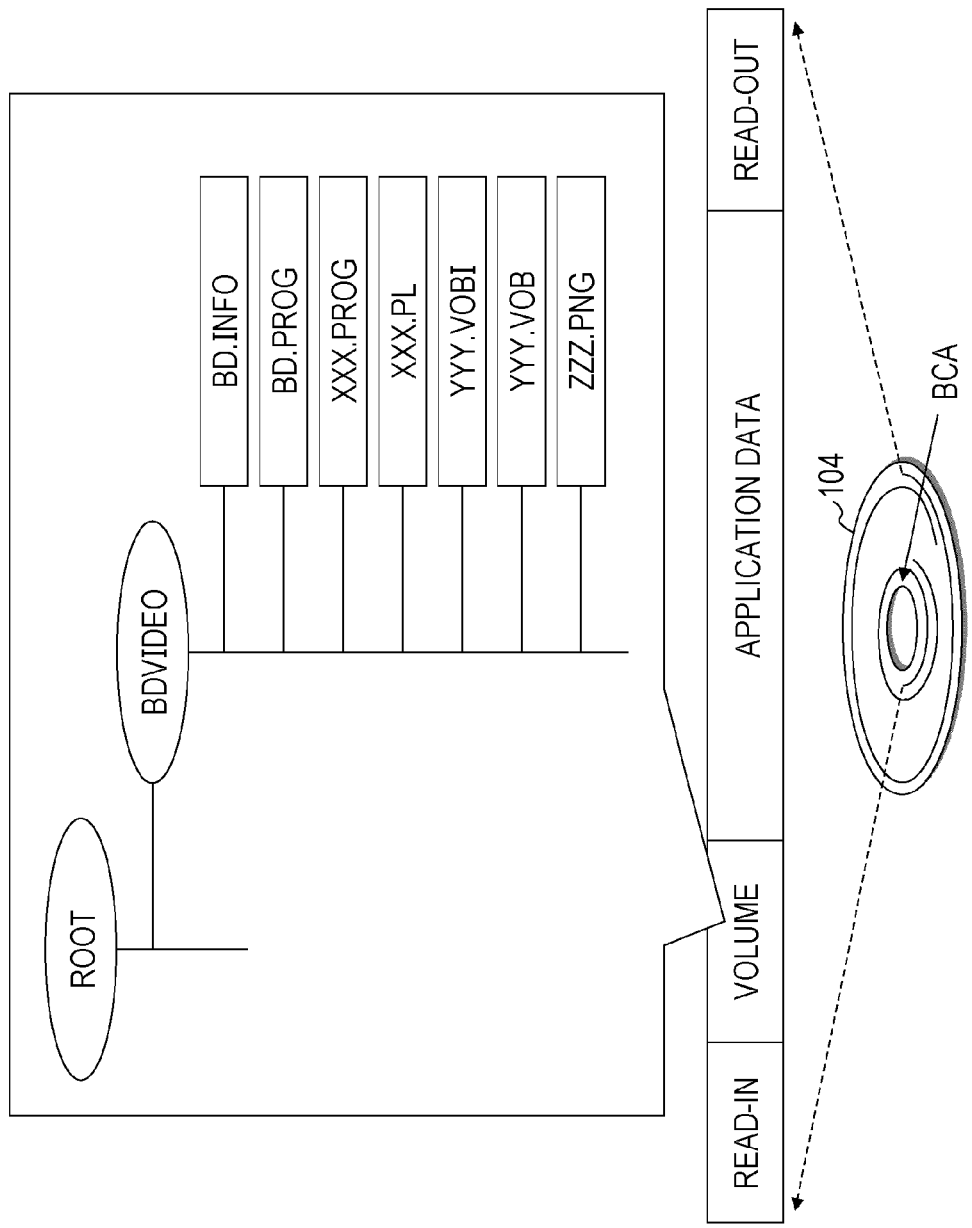
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BCA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded. The following seven types of files are recorded beneath the BDVIDEO directory.

BD.INFO (fixed filename)

This is one of "BD management information", and is a file in which is recorded information relating to the entire BD-ROM. The BD-ROM player reads out this file first.

BD.PROG (fixed filename)

This is one of "BD playback programs", and is a file in which is recorded a program relating to the entire BD-ROM.

XXX. PL ("XXX" is variable, suffix "PL" is fixed)

This is one of "BD management information", and is a file in which is recorded playlist (Play List) information that records a scenario. Each playlist has one file.

XXX.PROG ("XXX" is variable, suffix "PROG" is fixed)

This is one of "BD playback programs", and is a file in which is recorded a program for each aforementioned playlist. The correlation to the playlist is identified by the file body name ("XXX" matches).

YYY.VOB ("YYY" is variable, suffix "VOB" is fixed)

This is one of "AV data", and is a file in which is recorded a VOB (the same as the VOB described in the conventional example). One VOB corresponds to one file.

YYY.VOBI ("YYY" is variable, suffix "VOBI" is fixed)

This is one of "BD management information", and is a file in which is recorded management information relating to the VOB which is AV data. The correlation to the VOB is identified by the file body name ("YYY" matches).

ZZZ.PNG ("ZZZ" is variable, suffix "PNG" is Fixed)

This is one of "AV data", and is a file in PNG (an image format standardized by the World Wide Web Consortium (W3C) and is pronounced "ping") which is image data for configuring subtitles and menu screens. One PNG image corresponds to one file.

Player Configuration

Figure 6:
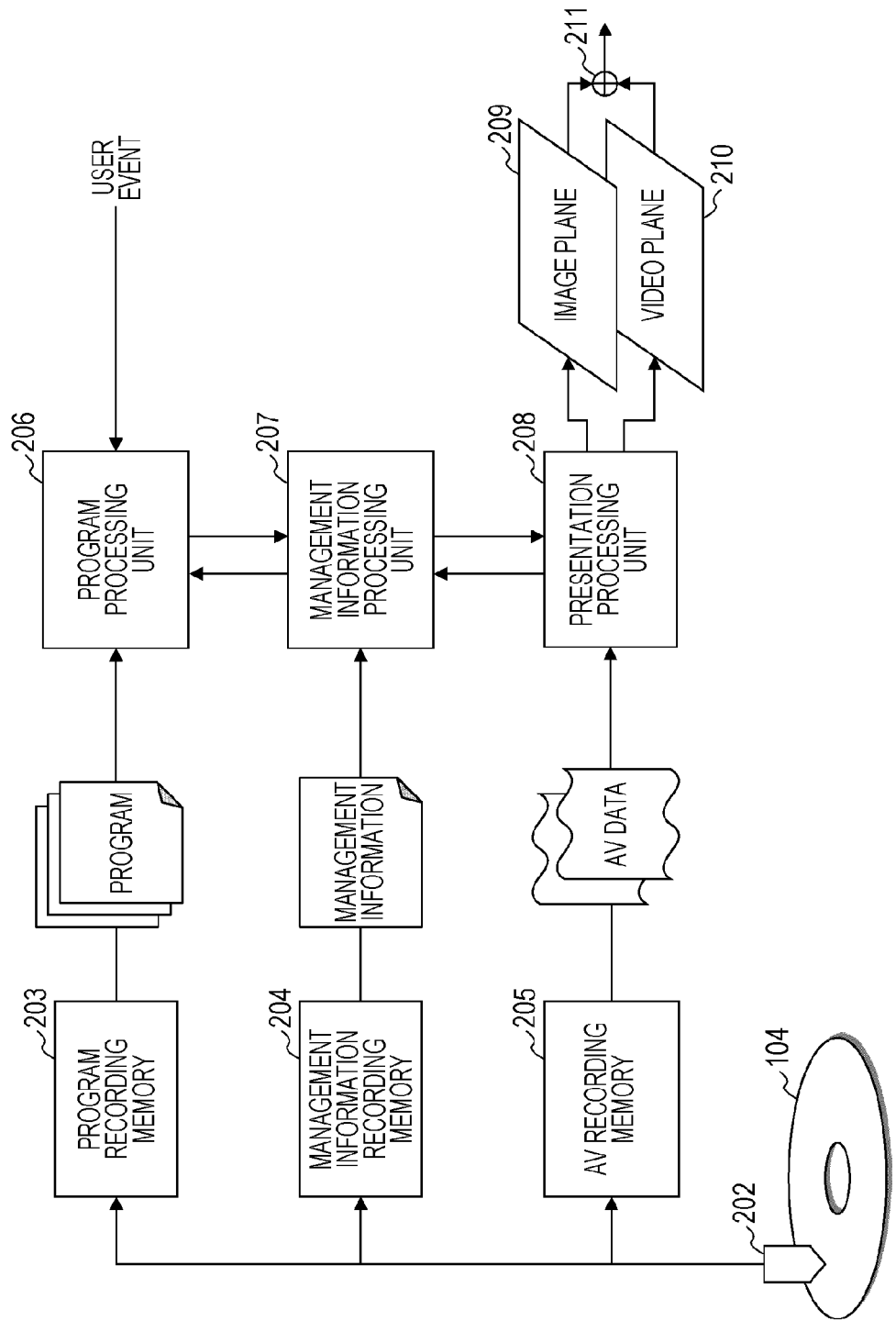
FIG. 6 is a diagram illustrating an overview of a basic configuration of a BD-ROM player that plays BD-ROMs.

Next, the configuration of a player that plays the BD-ROM 104 will be described with reference to FIGS. 6 and 7. FIG. 6 is a schematic diagram illustrating the basic configuration of a BD-ROM player that plays the BD-ROM 104.

The BD-ROM player illustrated in FIG. 6 reads out data on the BD-ROM 104 via an optical pickup 202. The data that is read out is stored in dedicated memory in accordance with the type of each data.

The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, instructions of AV data to be played are given to the presentation processing unit 208. The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a TV or the like.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303. The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308.

The demultiplexer 310 extracts VOB data recorded in the track buffer 309, based on the time obtained from the clock 307. Further, video data included in the VOB data is sent to the video processor 312, and the audio data to the sound processor 313.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX. PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to be handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX.PROG") is executed by the program processor 302. The program processor 302 processes a BD program in a case where an event has been sent from the scenario processor 305 or a case where an event has been sent from the UO manager 303.

In a case where a request has been sent from the user by a remote controller key, the UO manager 303 generates an event corresponding to this request, and sends to the program processor 302. Playback of a BD-ROM is performed by the operations of the components in this way.

Application Space

Figure 8:
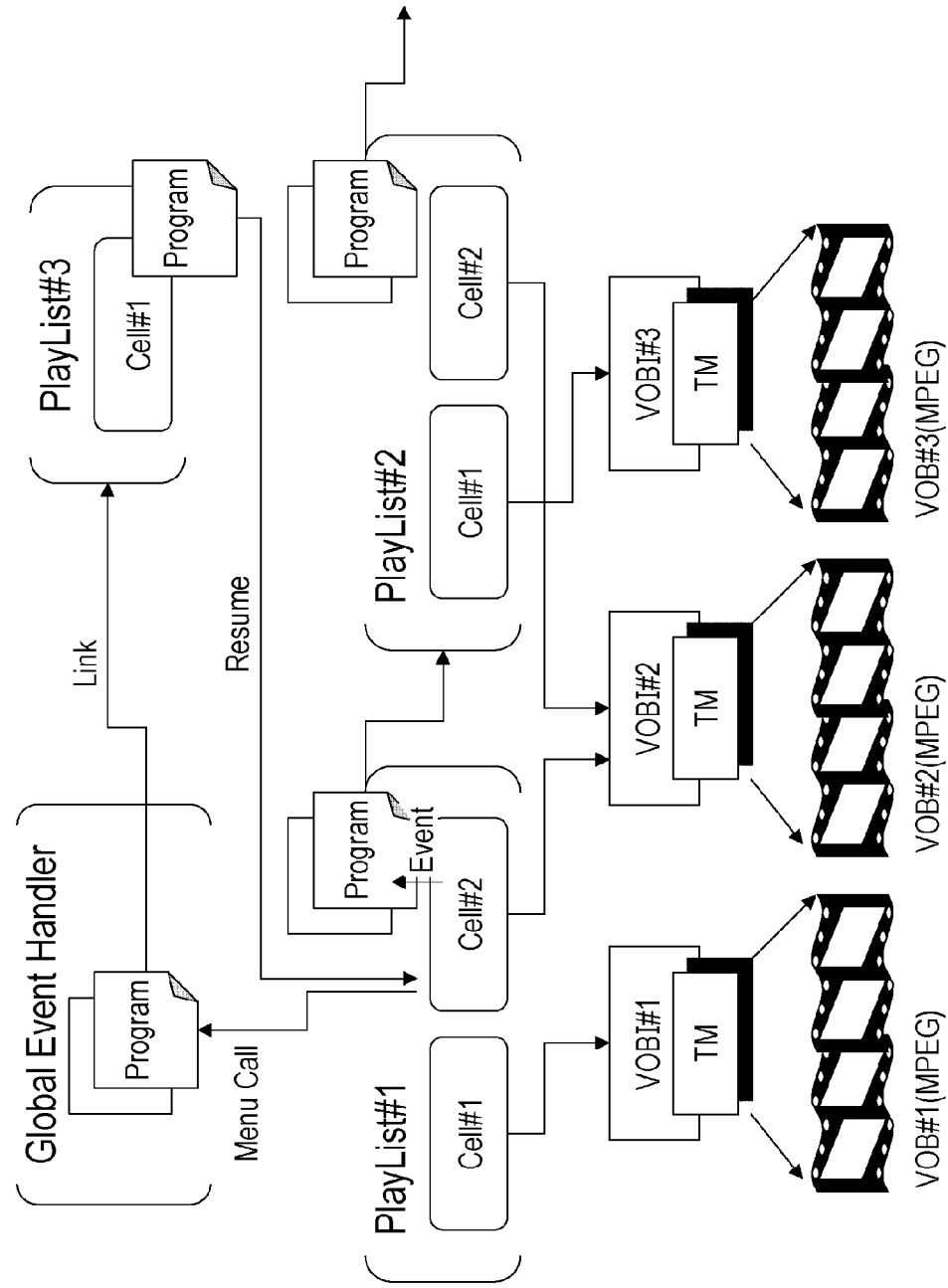
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program.

As long as there is no dynamic scenario according to a program, the playlist is simply playing the individual cells in order, and playback of the playlist ends at the point that playback of all cells has ended. On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point where the audio or subtitles was changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
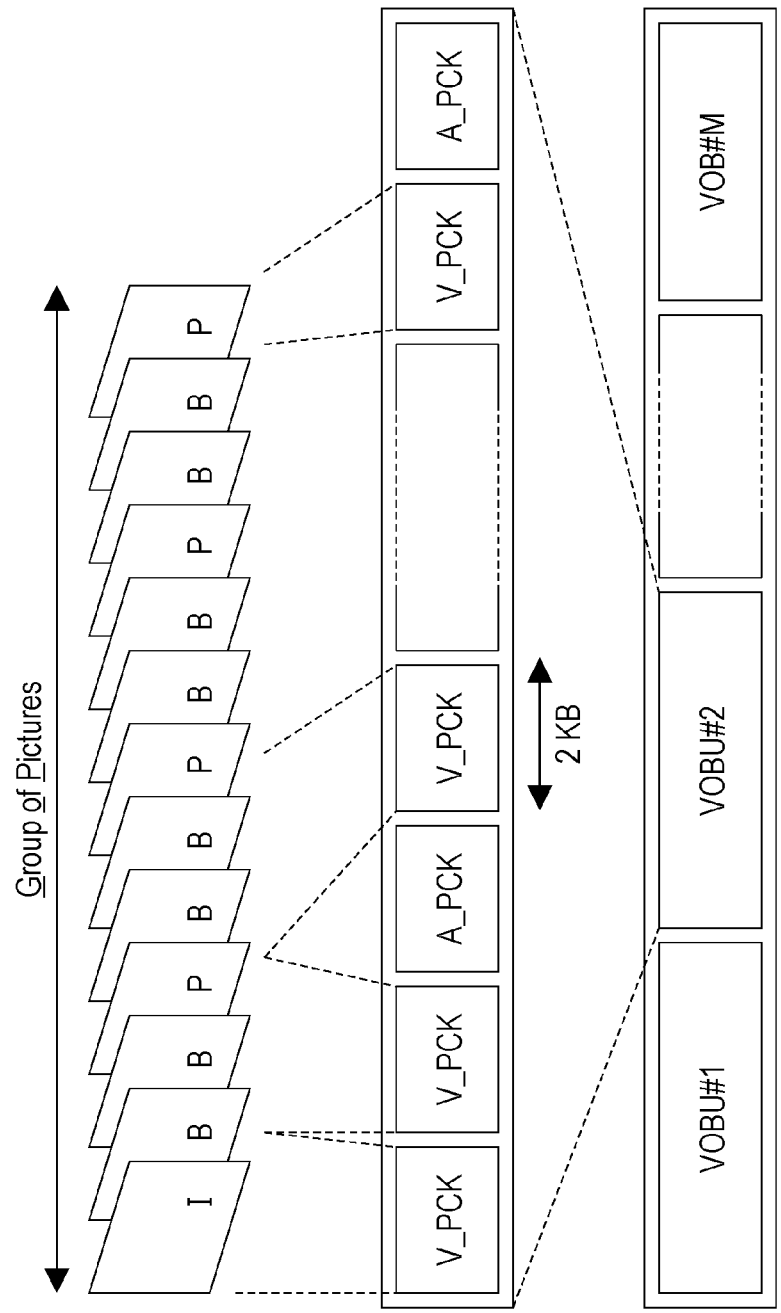
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
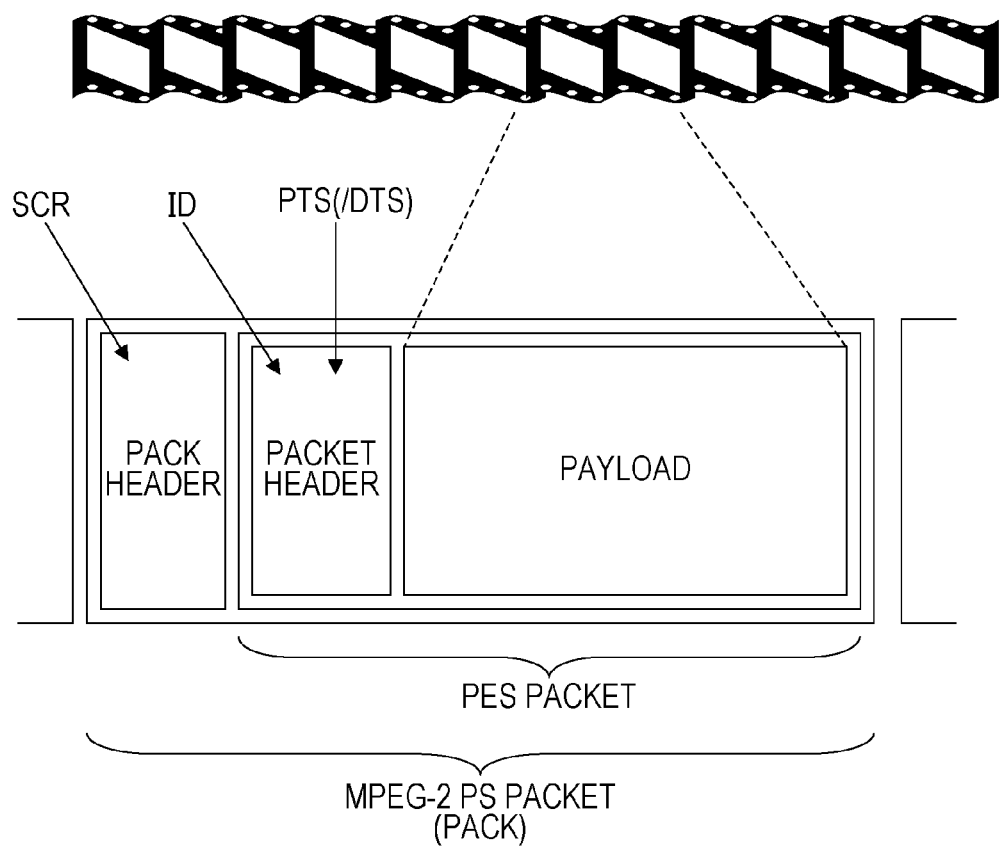
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet header is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams.

Interleaved Recording of VOB

Figure 11:
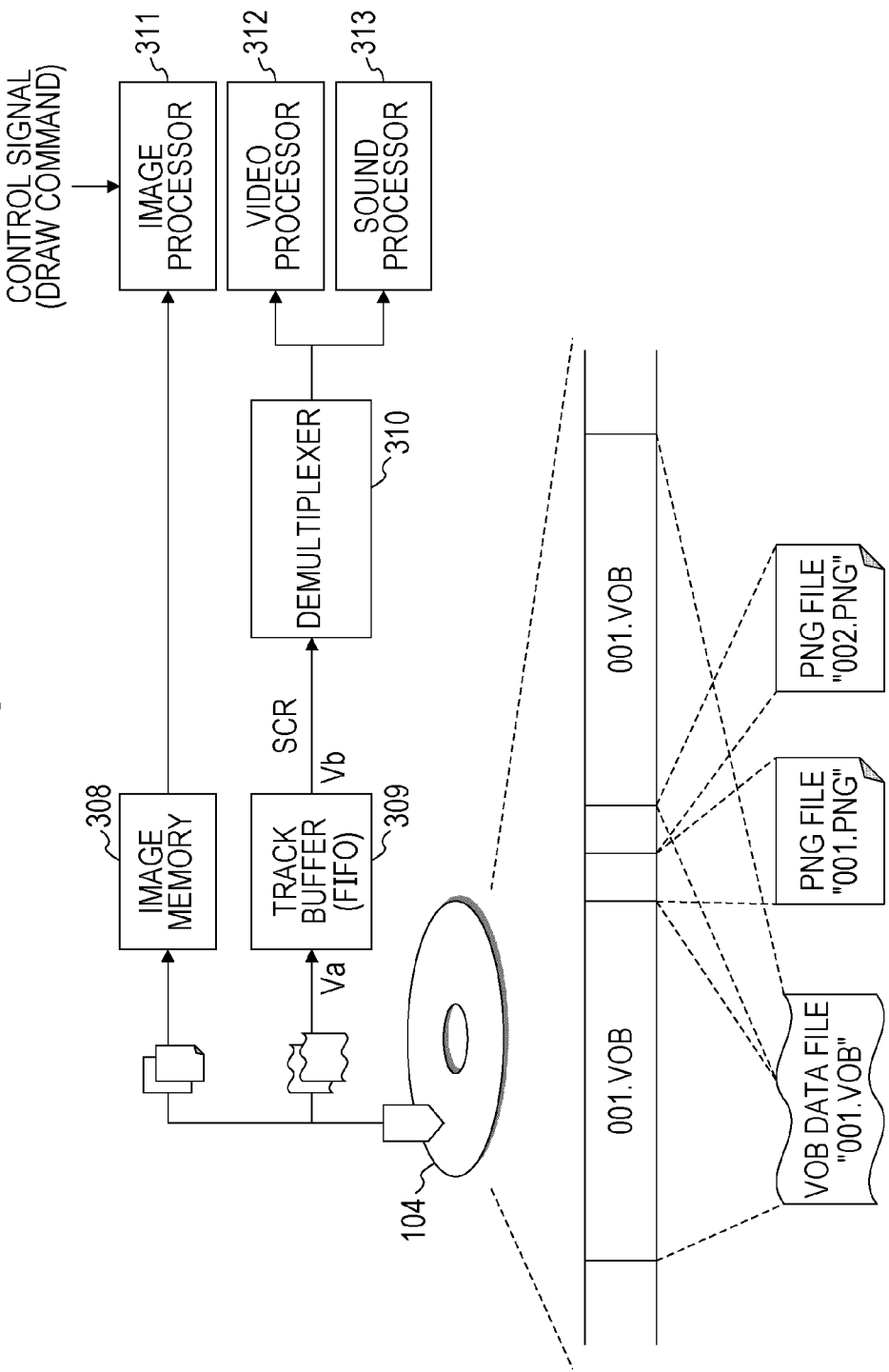
FIG. 11 is a diagram for describing the relationship between AV data and player configuration.

Interleaved recorded of VOB files will be described with reference to FIGS. 11 and 12. FIG. 11 is a diagram for describing the relationship between the AV data and the configuration of a BD-ROM player.

The drawing at the upper tier in FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

Figure 7:
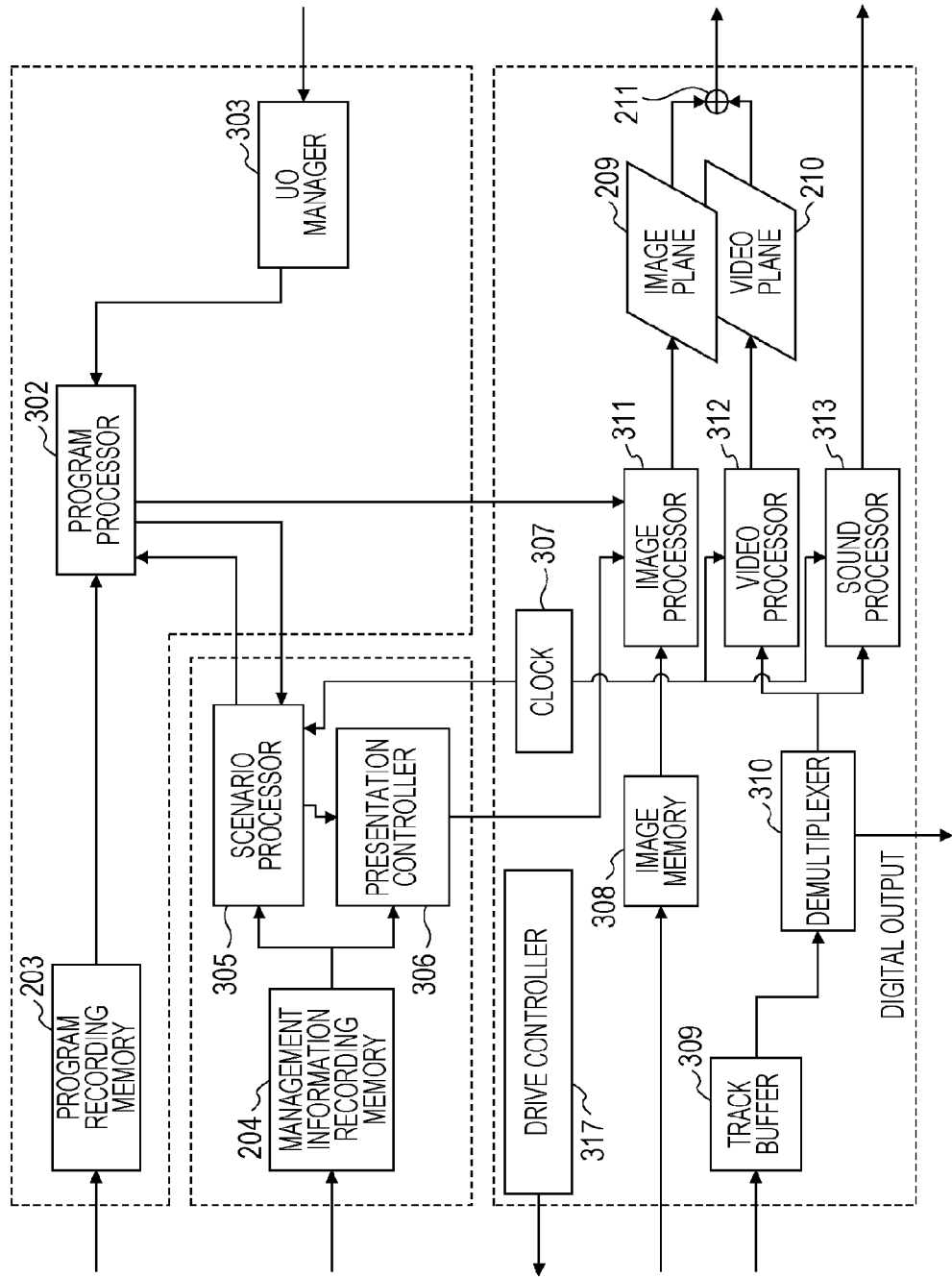
FIG. 7 is a block diagram where the configuration of the player illustrated in FIG. 6 is detailed.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

The drawing at the lower tier in FIG. 11 is a diagram illustrating interleaved recording of a VOB file and PNG files on the BD-ROM. Generally, in the case of ROM, such as CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, method where a VOB file is divided into several blocks, and the VOB file and image data are subjected to interleaved recording is employed with the present embodiment.

The lower tier in FIG. 11 is a diagram for describing interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
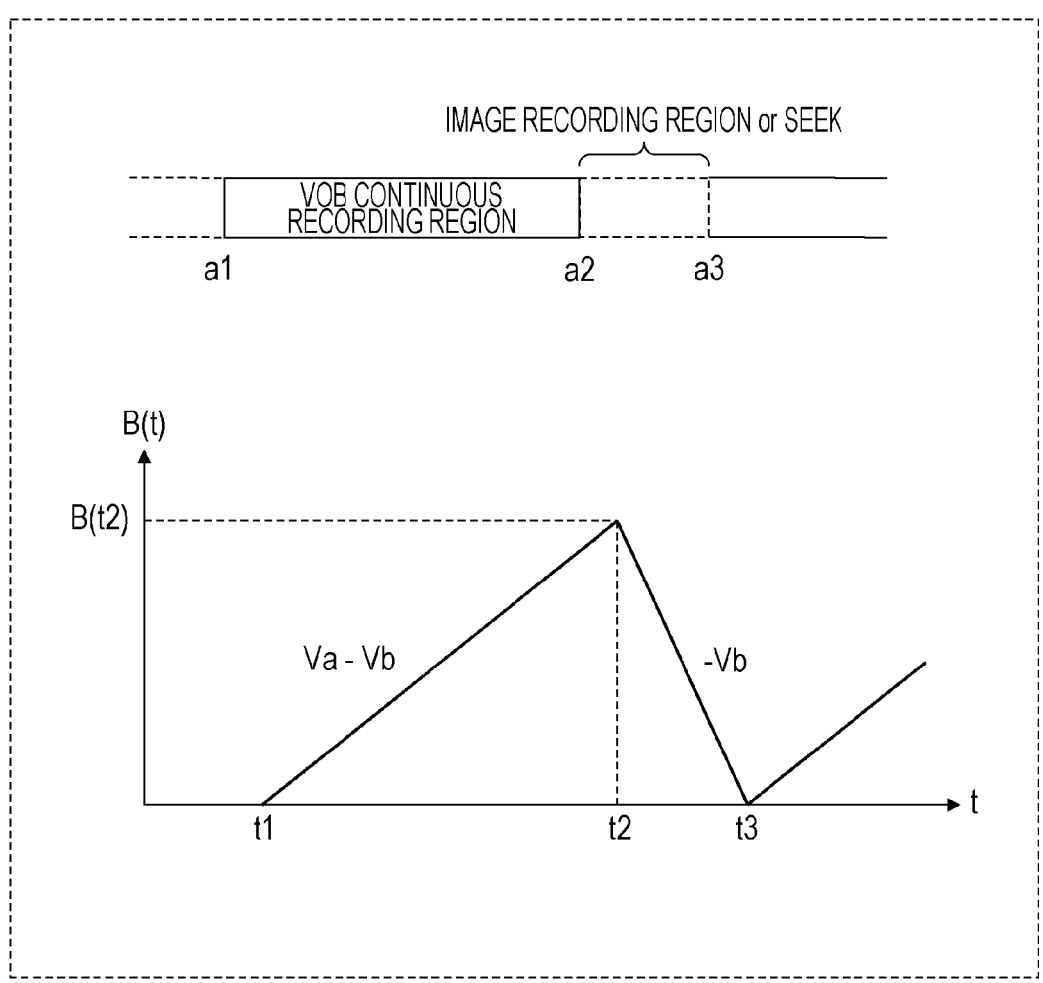
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. The continuous recording region of the VOB continues from "a1" to "a2" as illustrated in the drawing at the upper tier in FIG. 12. From "a2" to "a3" is a section where image data is recorded, so VOB data cannot be read out.

The drawing at the lower tier in FIG. 12 is a diagram illustrating the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va−Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va−Vb from "t1" to "t2", and the data accumulation amount B(t2) at the time "t2" can be calculated by the following (Expression 1).

$$B(t2)=(Va-Vb)\times(t2-t1) \quad \text{(Expression 1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following (Expression 2).

$$B(t2)\geq -Vb\times(t3-t2) \quad \text{(Expression 2)}$$

That is to say, the array of image data should be decided so as to satisfy (Expression 2).

Navigation Data Structure

Figure 13:
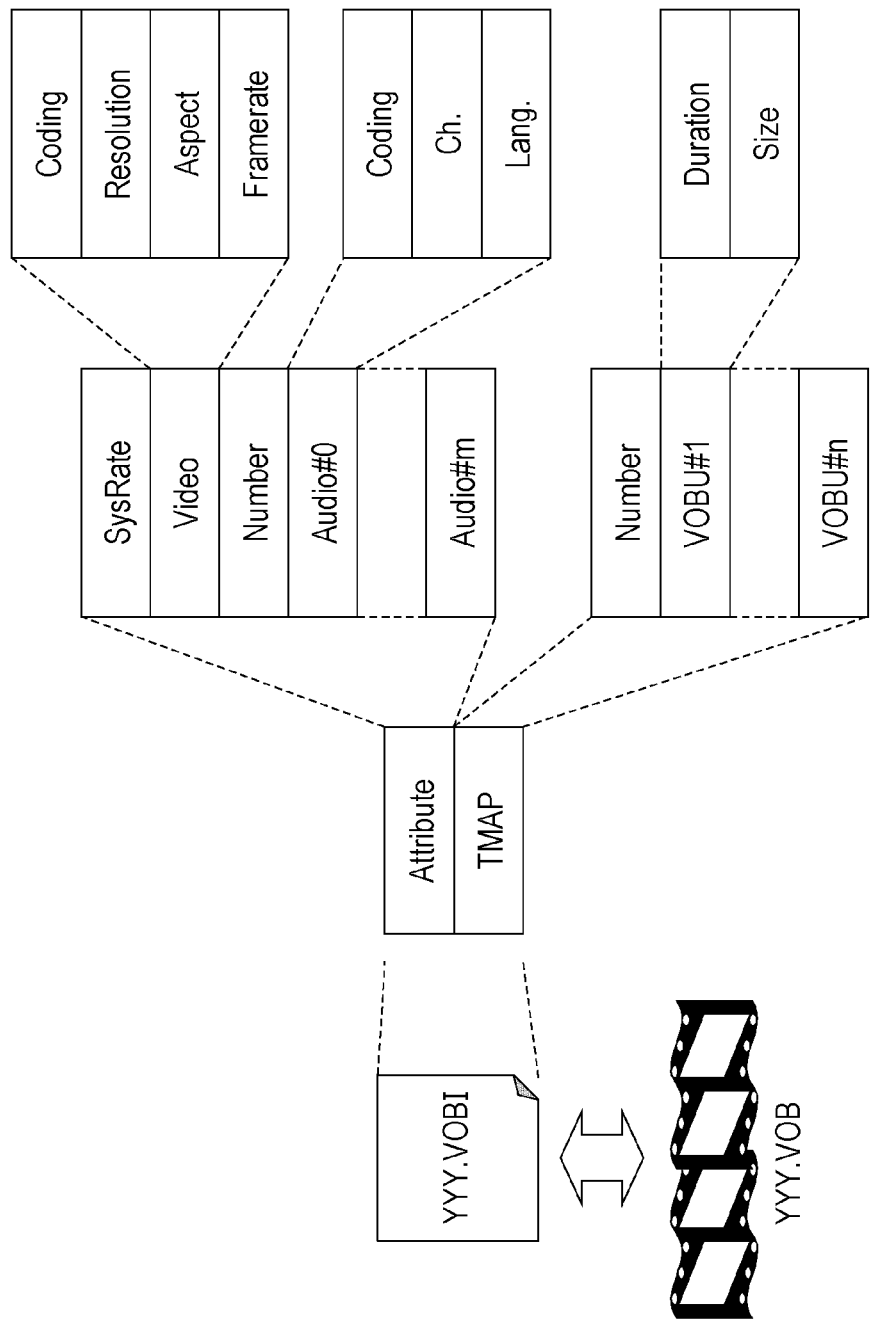
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB. The stream attribute information is of a configuration having video attributes (Video) and audio attributes (Audio#0 through Audio#m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
Compression format (Coding):
MPEG1
MPEG2
MPEG4
Resolution (Resolution):
1920×1080
1280×720
720×480
720×565
Aspect ratio (Aspect):
4:3
16:9
Frame rate (Framerate):
60
59.94
50
30
29.97
25
24

The following are example of fields that the audio attributes (Audio) have, and values which each can have.
Compression format (Coding):
AC3
MPEG1
MPEG2
LPCM
Number of channels (Ch):
1 to 8
Language attributes (Language):
JPN, ENG, . . . .

The time map (TMAP) is a table having information for each VOBU, and holds the number of VOBUs (Number) that the VOB has, and each VOBU information (VOBU#1 through VOBU#n). Each VOBU information has a playtime length (Duration) of the VOBU and data size (Size) of the VOBU.

Figure 14:
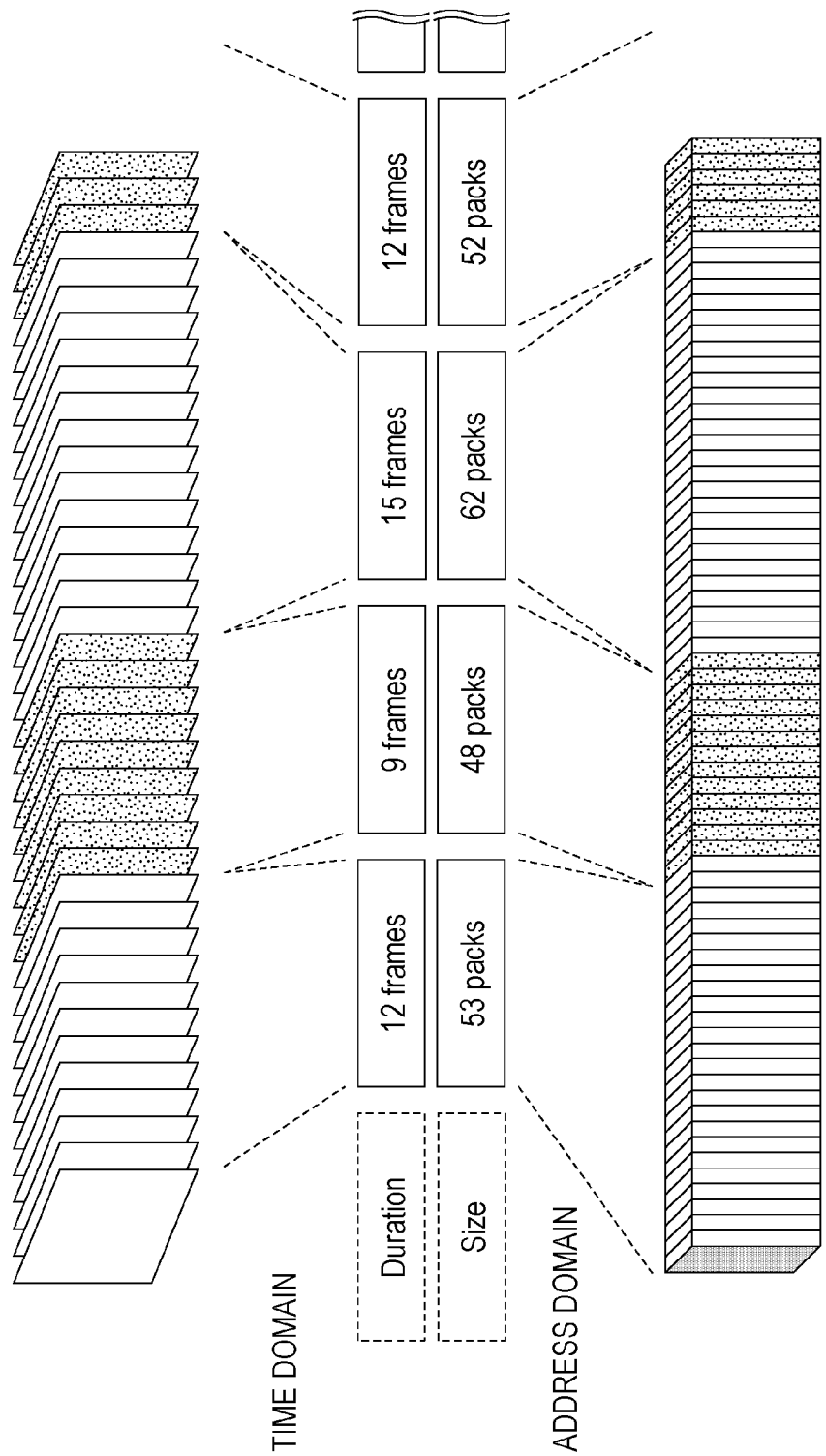
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression.

However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures. Accordingly, it is impossible to expression the relationship between time and address by a common expression in the case of MPEG video.

As a matter of course, it is impossible to expression the relationship between time and data by a common expression, with regard to an MPEG stream where MPEG video data has been multiplexed, i.e., a VOB, as well. Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
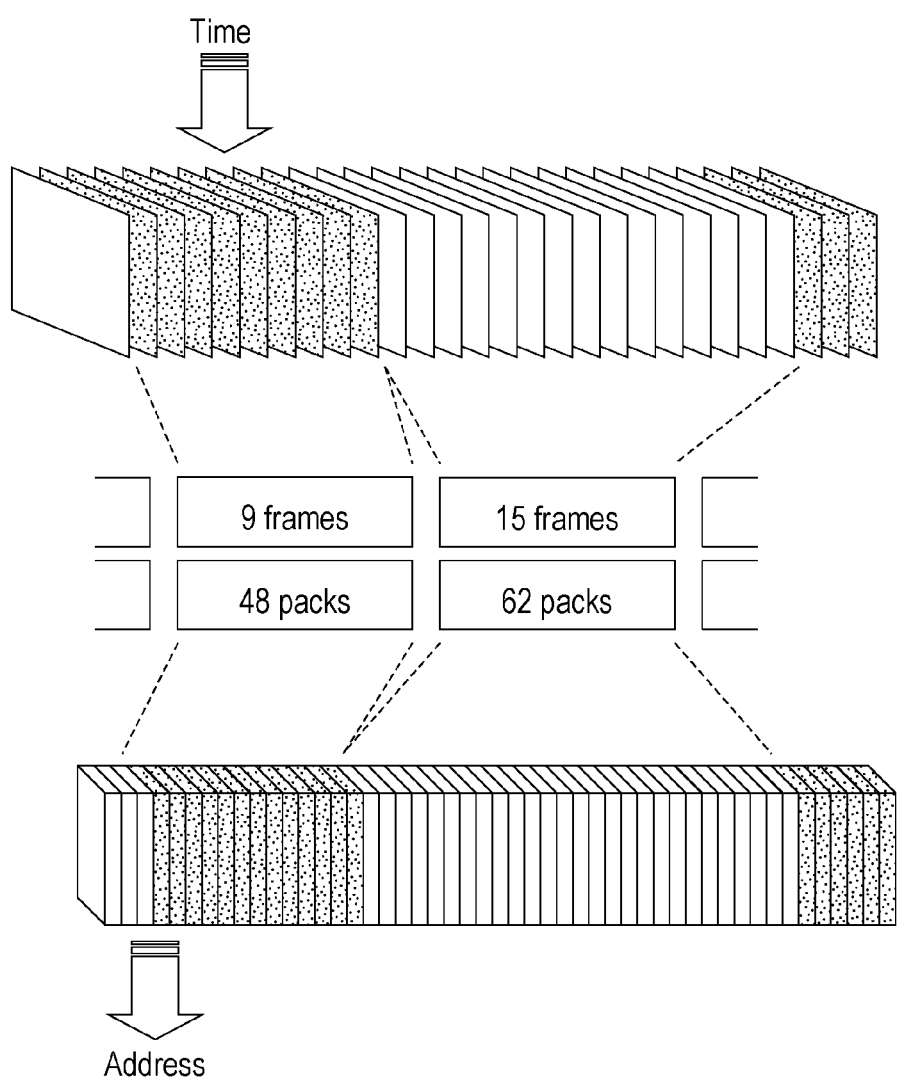
FIG. 15 is a diagram for describing an address information acquisition method using a time map.

How to use a time map (TMAP) will be described with reference to FIG. 15. FIG. 15 is a diagram for describing an address information acquisition method using a time map.

In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
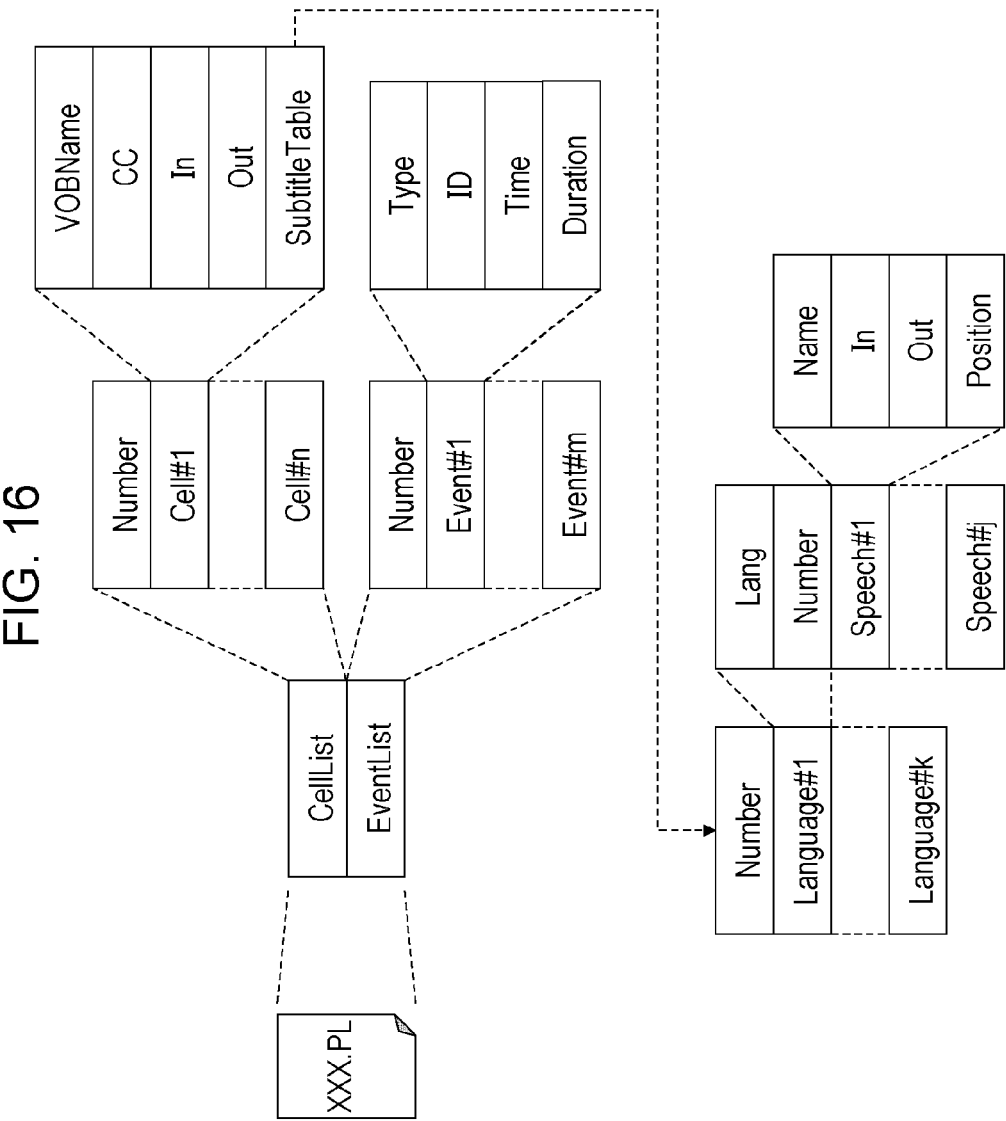
FIG. 16 is a diagram illustrating the configuration of a playlist.

Next, the internal structure of the playlist ("XXX.PL") will be described with reference to FIG. 16. FIG. 16 is a diagram illustrating the configuration of a playlist.

A playlist is made up of a cell list (CellList) and event list (EventList). A cell list (CellList) is information indicating the playback cell sequence within the playlist, and cells are played in the order of description in this list. The content of a cell list (CellList) is the number of cells (Number) and information of each cell (Cell#1 through Cell#n).

The information of each cell (Cell#1 through Cell#n) has the VOB filename (VOBName), the valid section start time (In) and valid section end time (Out) in this VOB, and a subtitle table (SubtitleTable).

The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language#1 through Language#k).

The table for each language (Language#1 through Language#k) is made up of language information (Language), the number of pieces of subtitle information of the subtitles to be displayed (Number) The subtitle information of the subtitles to be displayed (Speech#1 through Speech#j). Each subtitle information (Speech#1 through Speech#j) is made up of a corresponding image data filename (Name), subtitle display start time (In) and subtitle display end time (Out), and subtitle display position (Position).

The event list (EventList) is a table defining events occurring within this playlist. The event list is made up of the number of events (Number), and following the individual events (Event#1 through Event#m), each event (Event#1 through Event#m) being made up of event type (Type), event ID (ID), event generation time (Time), and valid period (Duration).

Figure 17:
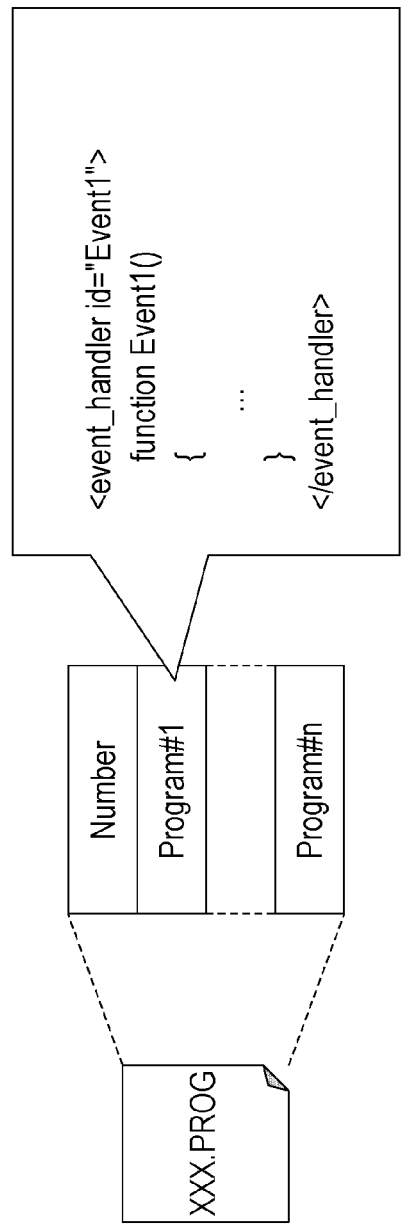
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist.

The event handler table contains the number of event handlers/programs that are defined (Number), and individual event handlers/programs (Program#1 through Program#n).

The description within each of the event handlers/programs (Program#1 through Program#n) contains a definition of the start the event handler (an <event_handler> tag) and an event handler ID (event_handler id) that is paired with the aforementioned event ID. Following this, the program is described between brackets "{" and "}" after "function".

Figure 18:
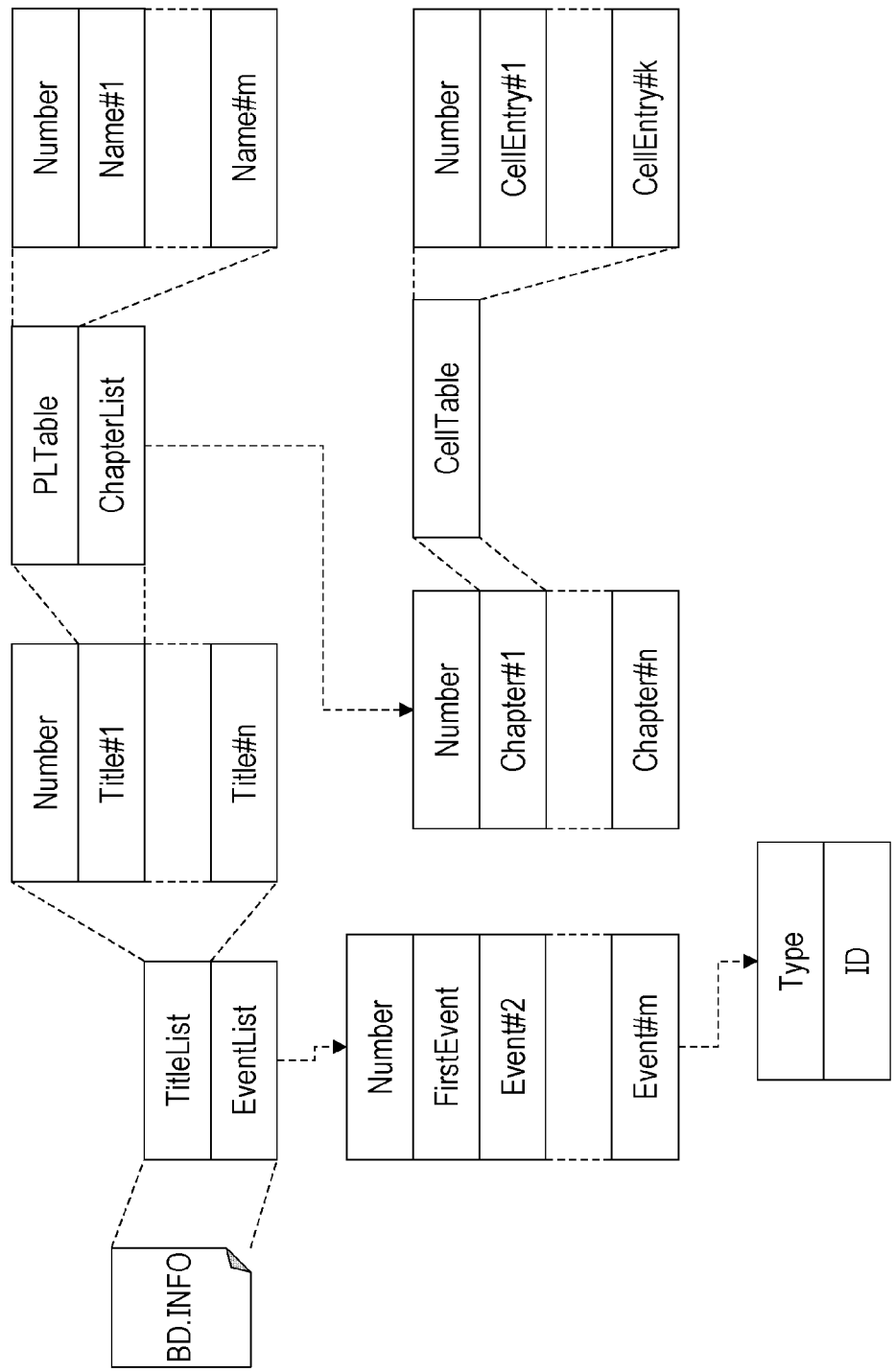
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information.

The overall BD-ROM information is made up of a title list (TitleList) and event list (EventList) for global events. The title list (TitleList) is made up of the number of titles in the disc (Number), and subsequently each title information (Title#1 through Title#n).

Each title information (Title#1 through Title#n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter#1 through Chapter#n). Each chapter information (Chapter#1 through Chapter#n) has a table of cells that this chapter includes (CellTable), the cell table (CellTable) being made up of the number of cells (Number) and entry information of each cell (CellEntry#1 through CellEntry#k). Cell entry information (CellEntry#1 through CellEntry#k) is described as the playlist name containing this cell and the cell No. within the playlist.

The event list (EventList) has the number of global events (Number) and information of each global event (Event#1 through Event#m). What is noteworthy here is that the global event that is defined first is called a first event (FirstEvent), and is the event that is executed first when the BD-ROM is inserted into the player. Each global event information (Event#1 through Event#m) has only the event type (Type) and ID of the event (ID).

Figure 19:
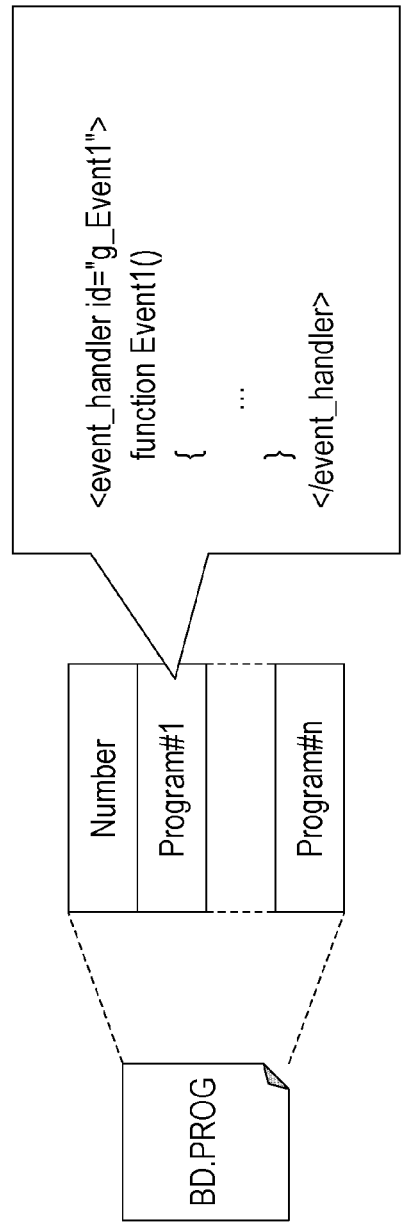
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
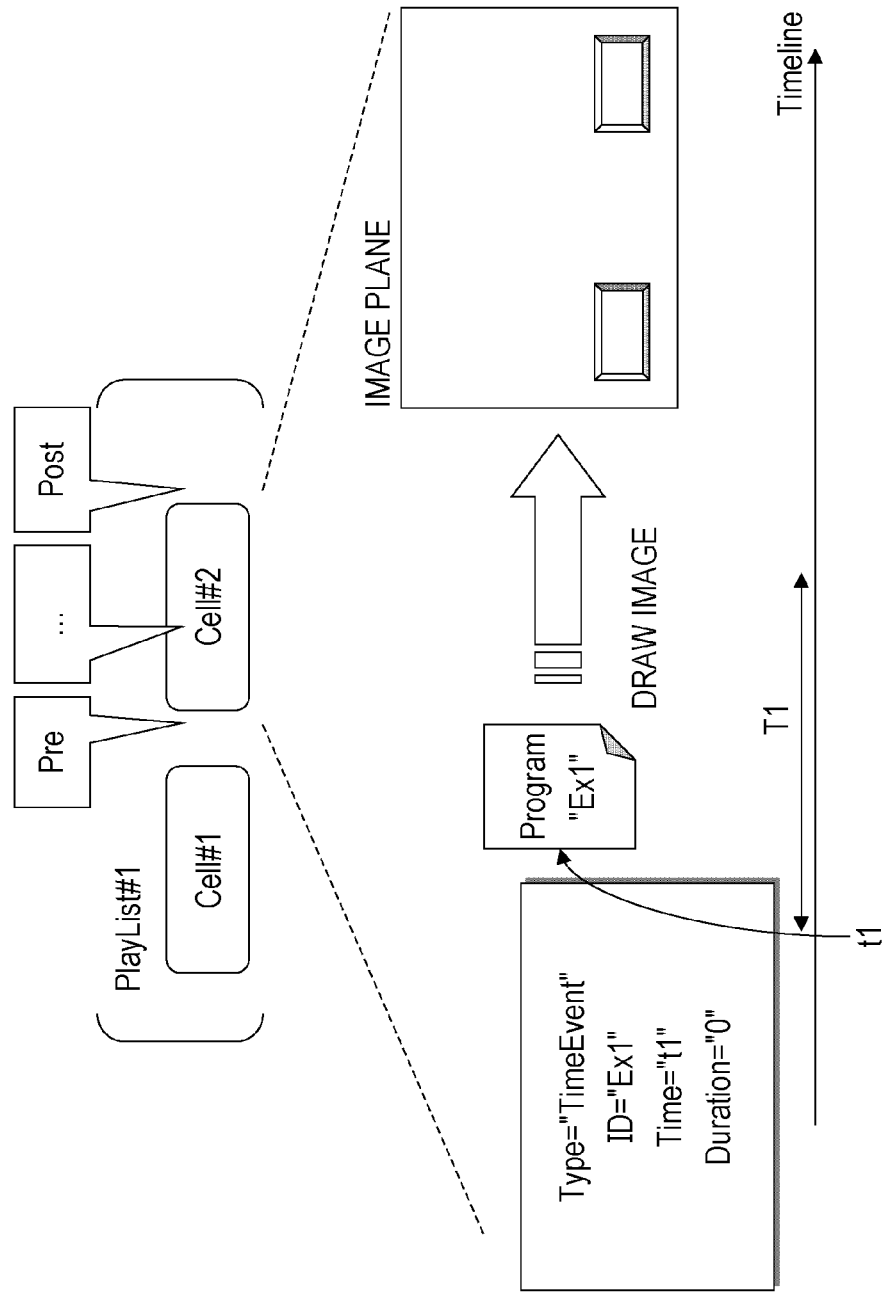
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL"). In a case of an event defined as a time event, i.e., event type (Type) is "TimeEvent", at the point of the event generation time ("t1"), a time event having the ID "Ex1" is output from the scenario processor 305 to the program processor 302.

The program processor 302 searches for the handler that has the ID "Ex1", and executes the relevant event handler. For example, in the case of the present embodiment, a two-button image can be drawn, or the like.

Figure 21:
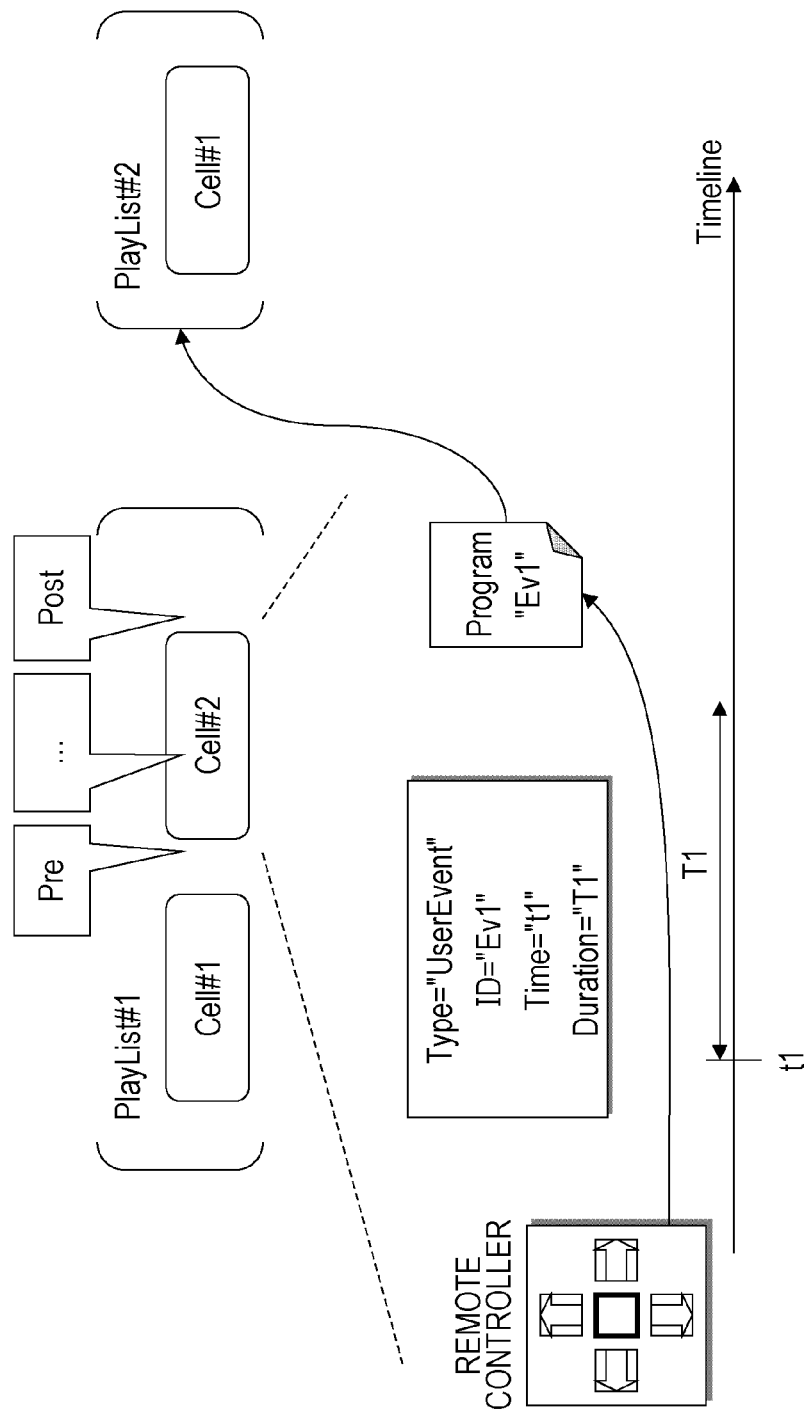
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX. PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("T1") described in the valid period information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist#2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

FIG. 22 is a diagram illustrating an example of a global event. As described earlier, a global event is defined in the event list (EventList) in the overall BD-ROM information ("BD.INFO"). An event defined as a global even, i.e., an event of which the event type (Type) is "Global Event", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist#3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

FIG. 23 is a diagram for describing the functional configuration of the program processor 302. The functional configuration of the program processor 302 will be described with reference to FIG. 23.

The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programming functions and player variables. The player variables are stored and held in a register.

The programming functions are based on Java (registered trademark) Script, and the following three functions are defined as BD-ROM-unique functions Link function: Stops the current playback, and starts playback from specified playlist, cell, and time.

Link (PL#, Cell#, time)

PL#: playlist name

Cell#: cell No.

Time: time in cell to start playback

PNG drawing function: Draws specified PNG data on image plane 209.

Draw (File, X, Y)

File: PNG filename

X: X coordinate position
Y: Y coordinate position
Image plane clear function: Clears specified region of image plane 209.
　Clear (X, Y, W, H)
　X: X coordinate position
　Y: Y coordinate position
　W: width in X direction
　H: width in Y direction The player variables include system parameters (SPRM) indicating setting values and so forth of the player, and general parameters (GPRM) usable in general uses.

FIG. 24 is a diagram illustrating a list of system parameters (SPRM).
　SPRM(0): Language code
　SPRM(1): Audio stream No.
　SPRM(2): Subtitle stream No.
　SPRM(3): Angle No.
　SPRM(4): Title No.
　SPRM(5): Chapter No.
　SPRM(6): Program No.
　SPRM(7): Cell No.
　SPRM(8): Selected key information
　SPRM(9): Navigation timer
　SPRM(10): playback time information
　SPRM(11): Mixing mode for karaoke
　SPRM(12): Country information for parental
　SPRM(13): Parental level
　SPRM(14): Player setting value (video)
　SPRM(15): Player setting value (audio)
　SPRM(16): Language code for audio stream
　SPRM(17): Language code for audio stream (extended)
　SPRM(18): Language code for subtitle stream
　SPRM(19): Language code for subtitle stream (extended)
　SPRM(20): Player region code
　SPRM(21): reserved
　SPRM(22): reserved
　SPRM(23): Playback state
　SPRM(24): reserved
　SPRM(25): reserved
　SPRM(26): reserved
　SPRM(27): reserved
　SPRM(28): reserved
　SPRM(29): reserved
　SPRM(30): reserved
　SPRM(31): reserved Note that in the present embodiment, the programming functions of the virtual player have been described as being based on Java (registered trademark) Script, Other programming functions may be used, such as B-Shell used in UNIX (registered trademark) OS or the like, Perl Script, and so forth, instead of Java (registered trademark) Script. In other words, the programming language in the present disclosure is not restricted to Java (registered trademark) Script.

Example of Program

FIGS. 25 and 26 are diagrams illustrating an example of a program in the event handler. FIG. 25 is a diagram illustrating an example of a program in an event handler according to control of a menu screen having two selection buttons.

The program to the left side in FIG. 25 is executed using a time event at the beginning of cell (PlayList#1.Cell#1). "1" is set to GPRM(0) here first, which is one of the general parameters. GPRM(0) is used in this program to identify a button that is selected. A state where the button [1] situated on the left side has been selected is held as the initial state.

Next, drawing of a PNG is performed for each of button [1] and button [2] using "Draw", which is a drawing function. The button [1] is drawn as a PNG image "1black-.png" with coordinates (10, 200) as the origin (upper left end). The button [2] is drawn as a PNG image "2white.png" with coordinates (330, 200) as the origin (upper left end).

At the end of this cell, the program to the right side in FIG. 25 is executed using a time event. A Link function is used here to instruct playing again from the beginning of this cell.

FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.

The following branching processing is performed by this event handler, using the value of GPRM(0) identifying the selected button, and SPRM(8) identifying the selected remote controller key.

Condition 1) Case where button[1] is selected, and the selected key is "right" key GPRM(0) is reset to 2, and the button in the selected state is changed to the button[2] at the right.
　The images of each of button[1] and button[2] are rewritten.
　Condition 2) Case where the selected key is "OK" key, and button[1] is selected Playback of playlist#2 is started.
　Condition 3) Case where the selected key is "OK" key, and button[2] is selected Playback of playlist#3 is started.

The program illustrated in FIG. 26 is interpreted and executed as described above.

Player Processing Flow

Figure 27:
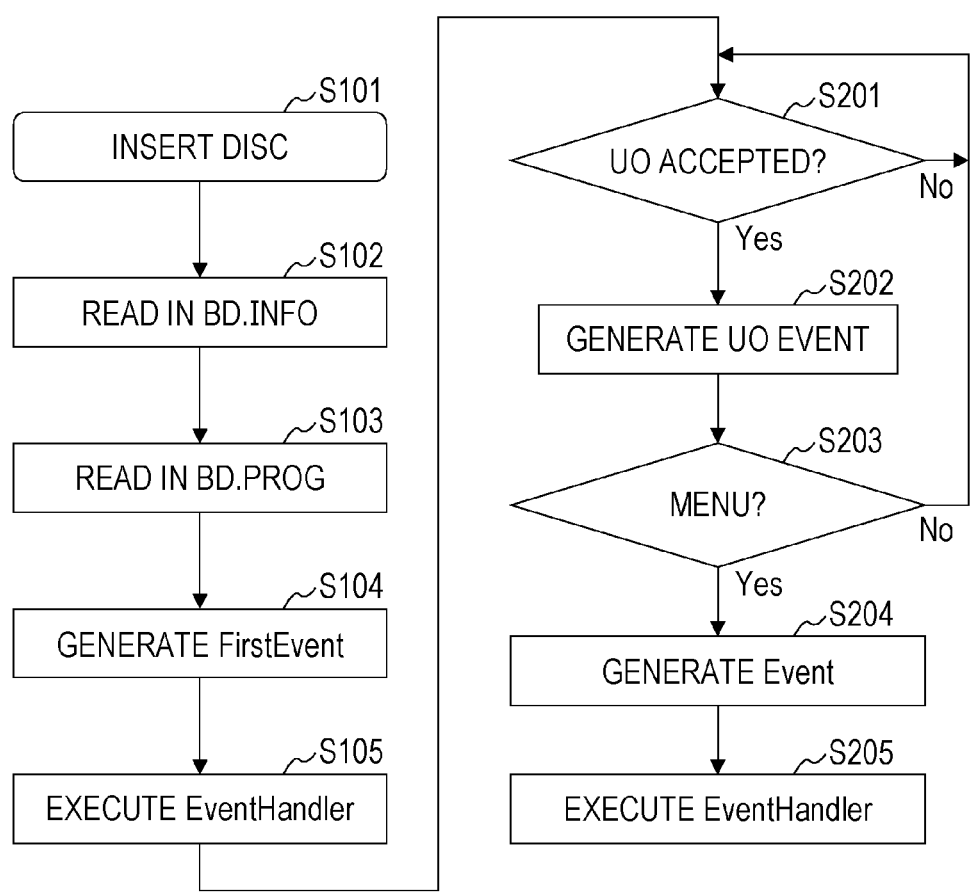
FIG. 27 is a flowchart illustrating the flow of basic processing for playback of AV data in a BD-ROM player.

The flow of processing at the player will be described with reference to FIGS. 27 through 30. FIG. 27 is a flowchart illustrating the basic flow of playback of AV data in a BD-ROM player.

Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.

Next, the scenario processor 305 generates the first event, in accordance with the first event (FirstEvent) information in the "BD.INFO" file (S104). The generated first event is received by the program processor 302, which executes the event handler corresponding to this event (S105).

It is expected that the event handler corresponding to the first event will have recorded therein information specifying a playlist to play first. If no playlist to play first is instructed, the player has nothing to play, and simply awaits a user event to accept (No in S201).

Upon receiving a remote controller operation from the user (Yes in S201), the UO manager 303 generates a UO event for the program processor 302 (S202).

The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
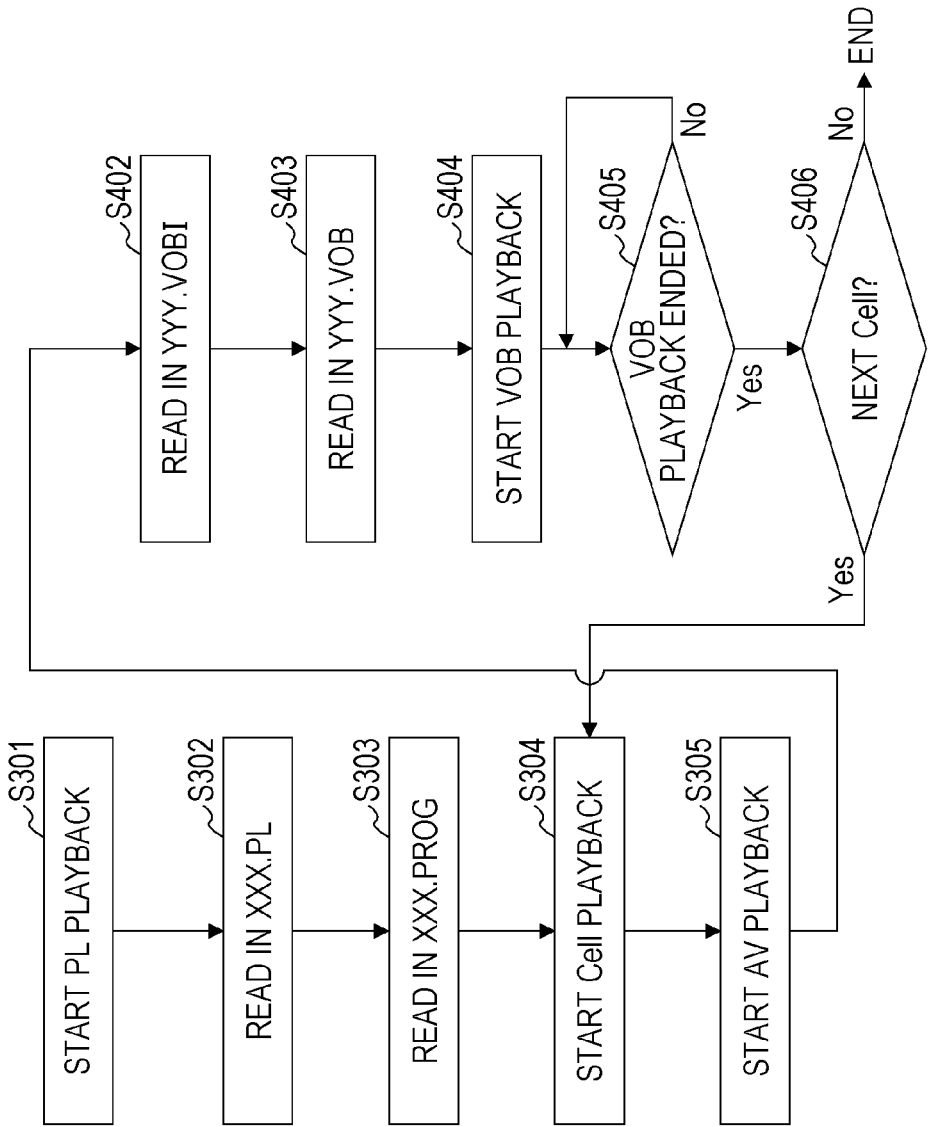
FIG. 28 is a flowchart illustrating the flow of processing in a BD-ROM player from starting to play a playlist until ending playing of the VOB.

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX. PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor to the presentation controller 306, and the presentation controller 306 starts AV data playback (S305).

Once playback of AV data is started, the presentation controller 306 reads in the VOB information file "YYY.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

Figure 29B:
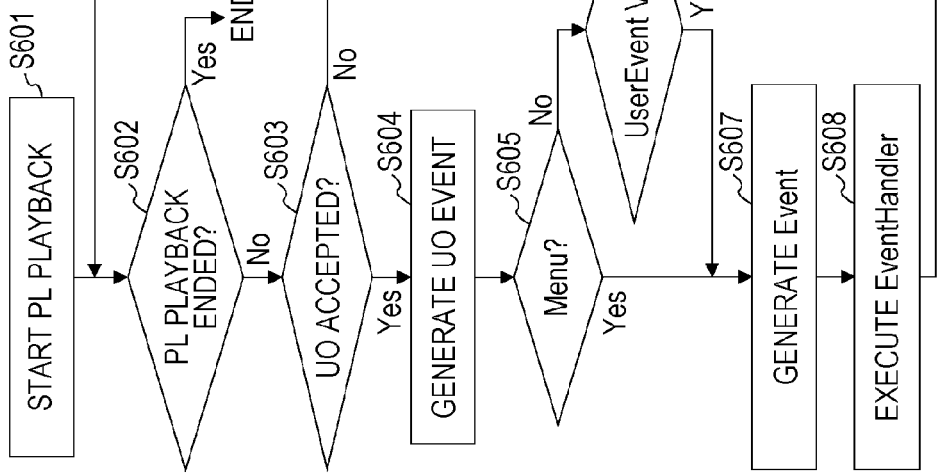
FIG. 29B is a flowchart illustrating the flow of processing relating to a user event in a BD-ROM player.
Figure 29A:
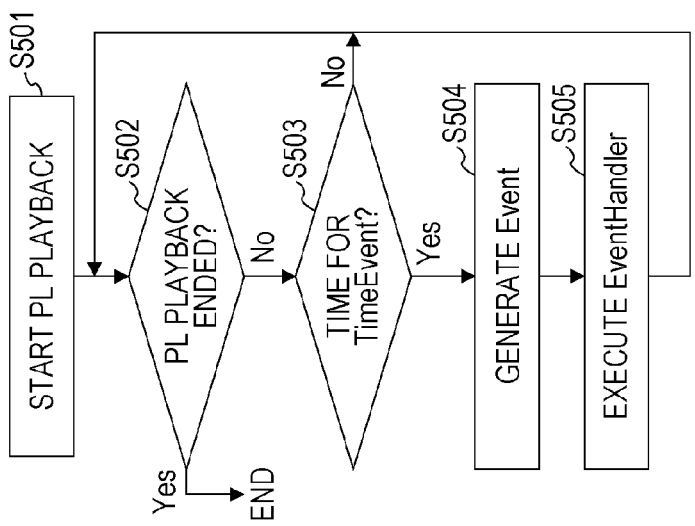
FIG. 29A is a flowchart illustrating the flow of processing relating to a time event in a BD-ROM player.

FIGS. 29A and 29B are flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of playlist playback is started at the BD-ROM player (S501), confirmation is made that playlist playback has not ended (No in S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of playlist playback is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

Figure 30:
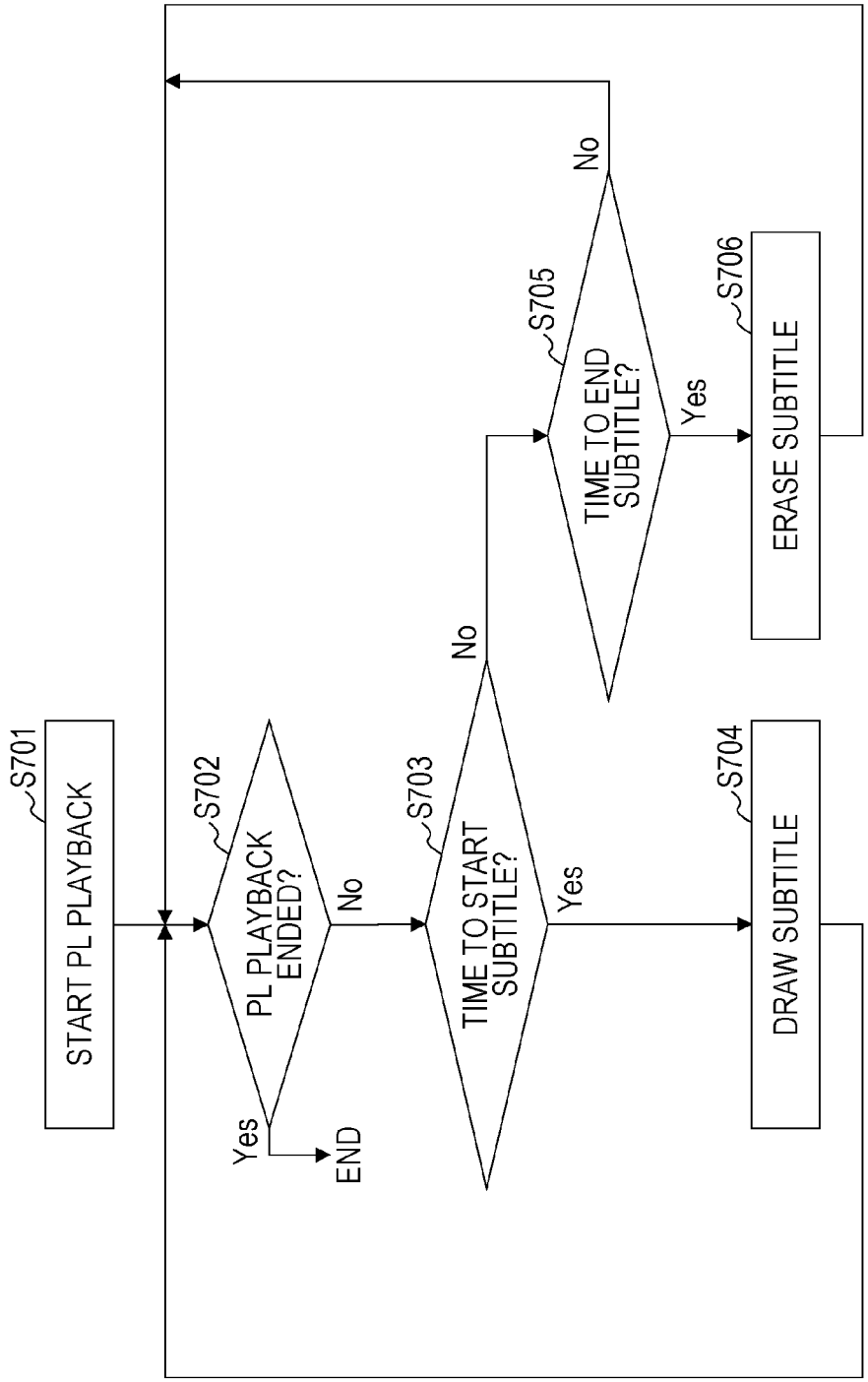
FIG. 30 is a flowchart illustrating the flow of processing subtitle data in a BD-ROM player.

FIG. 30 is a flowchart illustrating the flow of processing of subtitle data in the BD-ROM player. When playback of playlist playback is started at the BD-ROM player (S701), confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn from the image plane 209, in accordance with the instruction (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment of the present disclosure will be described. The second embodiment is content relating to recording or playing high-luminance (HDR: High Dynamic Range) video information with a BD. The second embodiment is basically based on the first embodiment, so the following description will be made primarily with regard to portions that are expanded in the second embodiment or portions that are different.

Figure 31A:
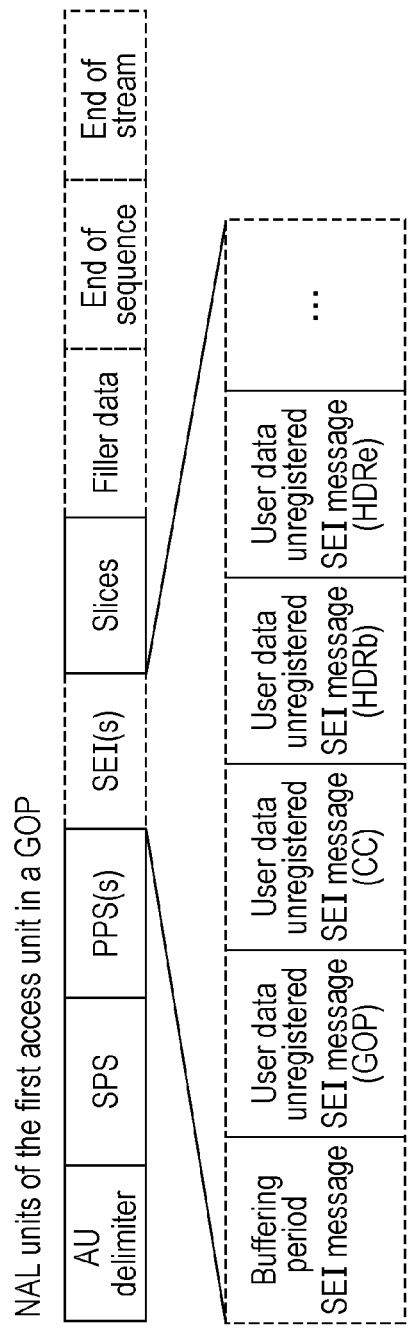
FIGS. 31A and 31B are diagrams describing arrays of NAL units.
Figure 31B:
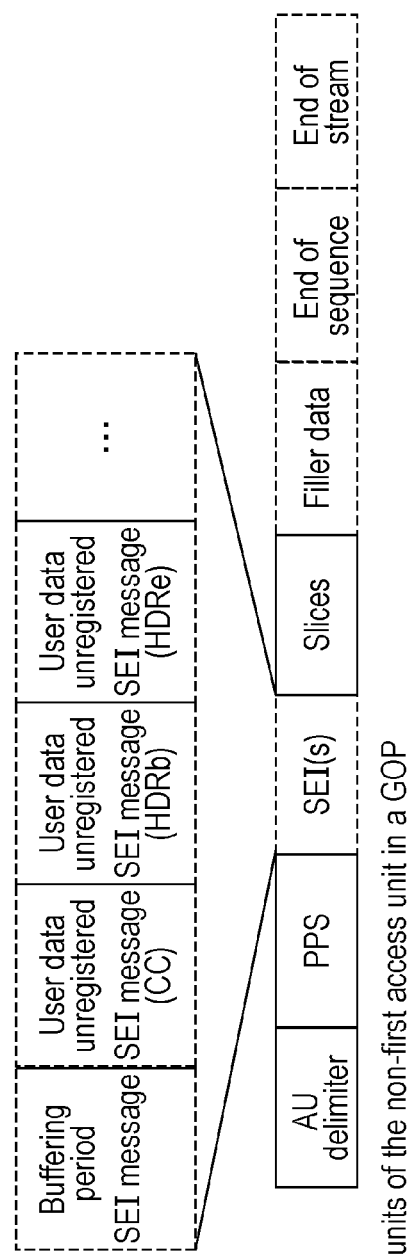

FIGS. 31A and 31B illustrate a method of sending high-luminance metadata using a video encoding format such as MPEG-4 AVC (also known as H.264) or HEVC (also known as H.265). Here, a unit made up of a picture reference configuration equivalent to a GOP (Group Of Pictures) used to improve random accessibility in MPEG-2 Video is used as a GOP in MPEG-4 AVC or HEVC, thereby encoding multiple pictures that have been grouped.

FIG. 31A indicates the encoding order of multiple Network Abstraction Layer (NAL) units in the first picture (first access unit) in the GOP. In the first picture in the GOP, there is a run of NALs of each of one AU delimiter, one SPS, one or more PPS, 0 or multiple SEI messages, and one or more Slices making up the picture, followed if necessary by the NALs of Filler data, End of sequence, and End of stream.

In the SEI message (SEI(s)), Buffering period SEI message is followed by several other SEI messages if necessary. For example, several SEI messages including (1) a User data unregistered SEI message (GOP) indicating the reference relationship of pictures within this GOP, (2) a User data unregistered SEI message (CC) indicating the Closed Captioning information of this picture, (3) a User data unregistered SEI message (HDRb) including standard and static high-luminance metadata indicating the luminance range such as the maximum luminance or minimum luminance in all of the pictures in this video sequence (VOB), (4) a User data unregistered SEI message (HDRe) including dynamic high-luminance metadata that is more detailed than the SEI message (HDRb), so as to indicate the luminance range such as the maximum luminance or minimum luminance in all of the pictures in this picture or GOP, and so forth, are encoded in this order.

The aforementioned SEI message (HDRb) or SEI message (HDRe) is transmitted along with the video information. This is to transmit information relating to luminance used at the time of mastering, and to give information regarding actually what level of brightness (cd/m^2) the luminance value (Y) for each pixel obtained after the video information is decoded.

For example, the SEI message (HDRb) or SEI message (HDRe) include correlation information between luminance that the pixels have and luminance at the time of mastering, such as, upon having decoded the video, the luminance of a pixel having a luminance value (Y) or 1000 was 5000 cd/m^2 when mastering. In a case where the maximum luminance (cd/m^2) that can be expressed by a TV connected to the player is acquired, information for changing the dynamic range of the entire picture in the luminance direction may be carried by the aforementioned SEI message (HDRb) or SEI message (HDRe).

The SEI message (HDRb) is an SEI message transmitted in increments of pictures or increments of GOPs to indicate an HDR video sequence, and transmits information relating to static luminance information of the overall video sequence (VOB). An HDR video sequence as used here means a video sequence where a SEI message (HDRb) is recorded.

The SEI message (HDRe) that transmits information relating to dynamic luminance that is more detailed does not have to be recorded in the HDR video sequence, and an HDR video sequence does not have to have even one therein. In a case where an SEI message (HDRe) exists, it is always an SEI message encoded immediately after an SEI message (HDRb), transmitting information relating to luminance in increments of pictures or increments of GOPs.

FIG. 31B illustrates the encoding order of multiple NAL units in a picture other than the first picture in the GOP (non-first access unit). In a picture that is not the first picture in the GOP, There is a run of NALs of each of one AU delimiter, 0 or one PPS, 0 or multiple SEI messages, and one or more Slices making up the picture, followed if necessary by the NALs of Filler data, End of sequence, and End of stream.

The SEI message (HDRb) or SEI message (HDRe) each store the above information, and is given to each picture according to the method illustrated in FIGS. 31A and 31B. In a case of transmitting information relating to luminance in increments of GOPs, the SEI message (HDRb) and SEI message (HDRe) are both only given to the first picture in the GOP, and are not given to pictures that are not the first in the GOP at all.

Figure 32:
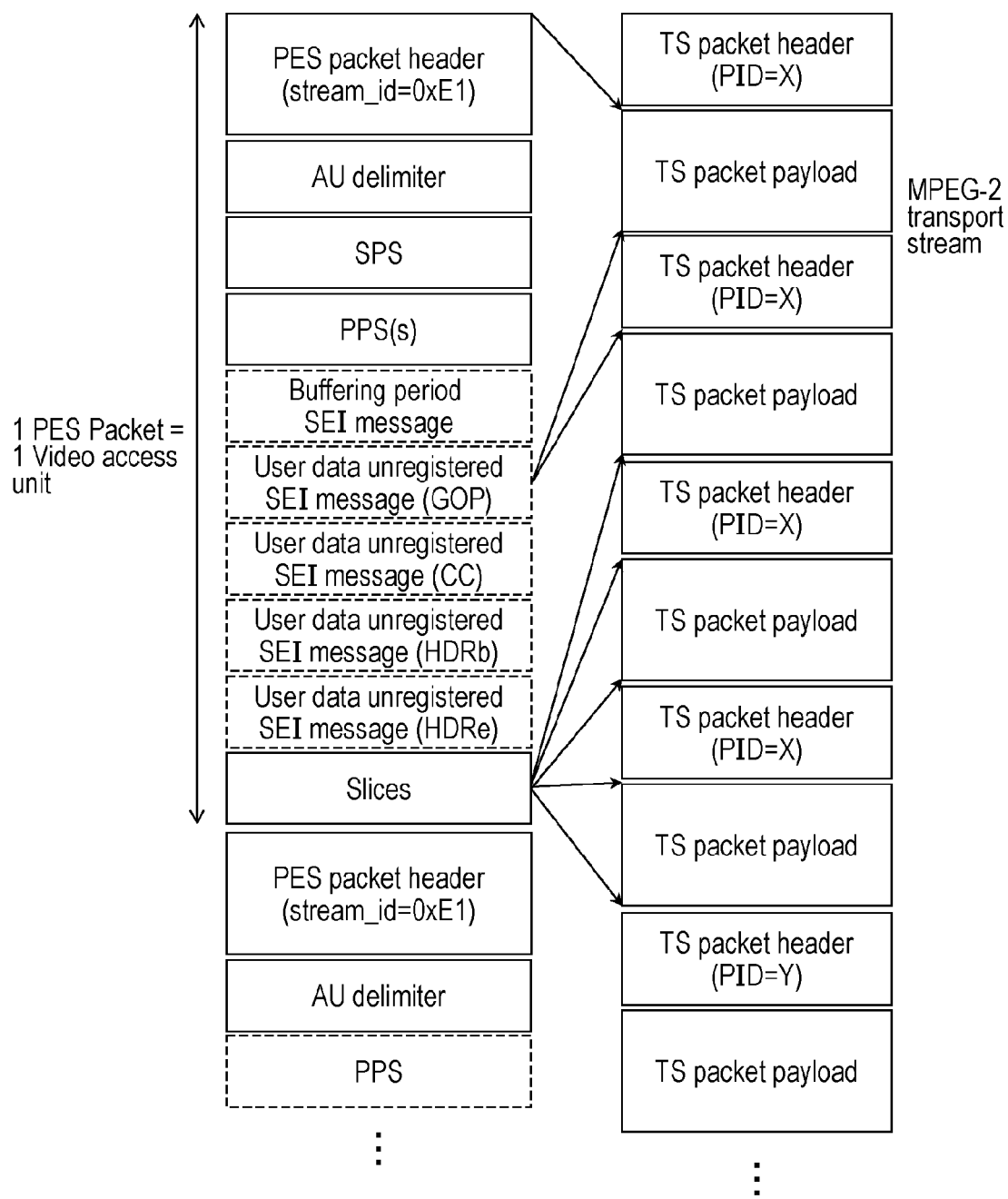
FIG. 32 is a diagram for describing an example of MPEG-2 TS multiplexing of an HDR video stream.

FIG. 32 is a diagram illustrating a method of multiplexing an HDR video stream including up to an SEI message (HDRe) by MPEG-2 TS. Note that in the present embodiment, the term sequence may mean the same as a stream, or may be part of a stream. After storing one picture (one frame or one video access unit) in one PES packet to put the HDR video stream into a PES, data in the PES packets are divided and stored in order in the payload of PID=X TS packets.

In the case of the method illustrated in FIG. 32, the HDR video sequence including up to the SEI message (HDRe) which is the PES packets of stream_id=0xE1 is divided and stored in order in the TS packets of the same PID (PID=X). Note that in a case of transmitting information of the SEI message (HDRe) at the time of outputting an HDR video sequence by HDMI (registered copyright) as in the method illustrated in FIG. 32, there are cases where the processing for searching for the SEI message (HDRe) from the entire video sequence may become sluggish.

Figure 33:
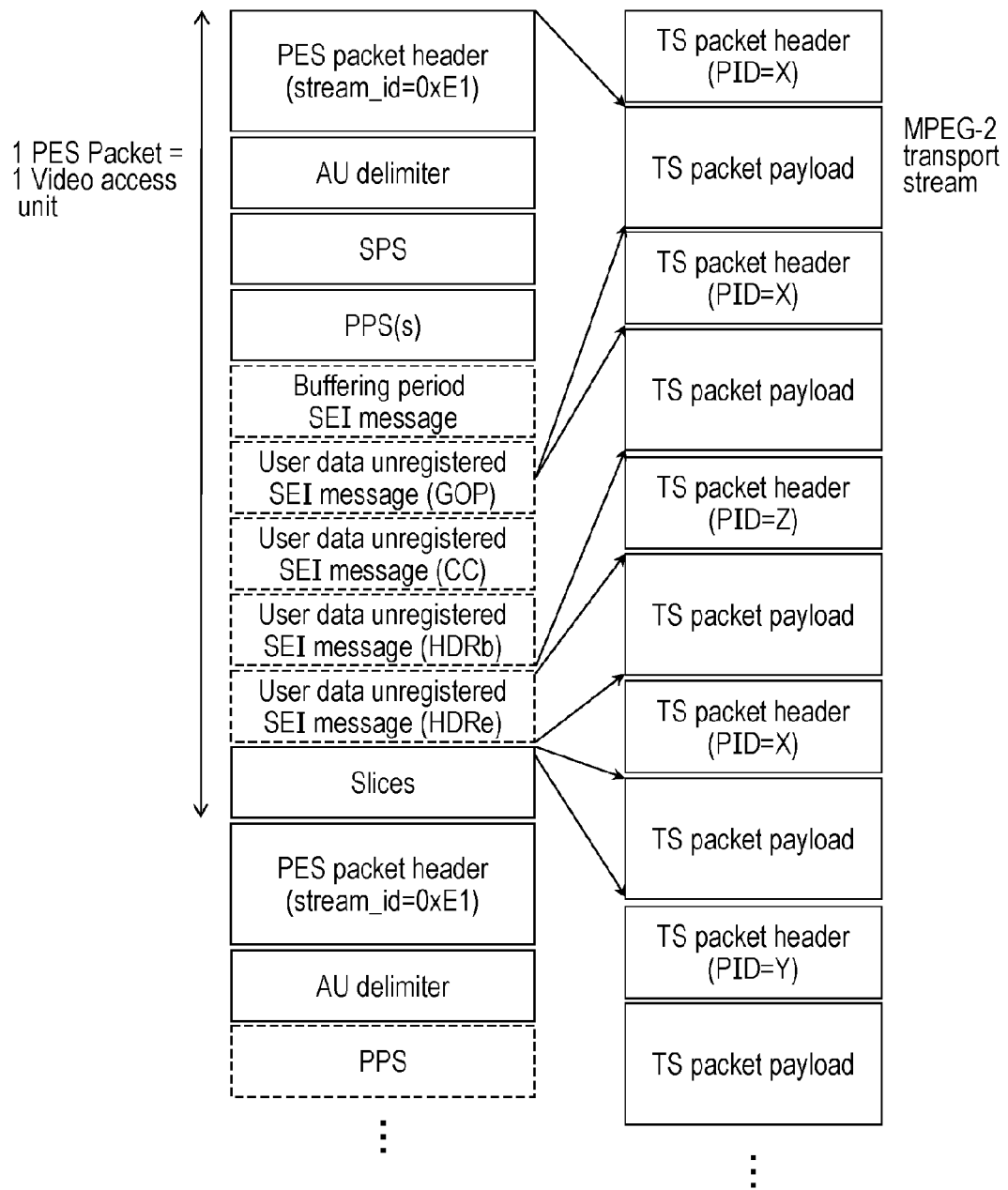
FIG. 33 is a diagram for describing an example of MPEG-2 TS multiplexing of an HDR video stream.

FIG. 33 is a diagram for describing another method for multiplexing an HDR video stream including up to an SEI message (HDRe) by MPEG-2 TS. One picture (one frame or one video access unit) is stored in one PES packet, to put the HDR video stream into a PES, and data in the PES packets is divided and stored in order in the payloads of the TS packets of both PID=X and Z.

In the case of the method illustrated in FIG. 33, the HDR video sequence which is the PES packets of stream_id=0xE1 is divided and stored in order in the TS packets of PID=X, and just the SEI message (HDRe) is stored alone in the TS packet of PID=Z. At the time of outputting HDR video by HDMI (registered trademark), when the SEI message (HDRe) information is transmitted, only the SEI message (HDRe) is stored in the TS packet where PID=Z, as in the method illustrated in FIG. 33. Accordingly, the processing for searching for the SEI message (HDRe) is light.

Decoding just the HDR video sequence transmitted by TS packets of PID=X is easy. However, in order to perform even higher luminance video playback including up to the SEI message (HDRe) needs additional processing of transmitting the TS packets of both PID=X and Z to the same TB buffer (an upstream buffer used in the T-STD model of the MPEG-2 system).

Figure 34:
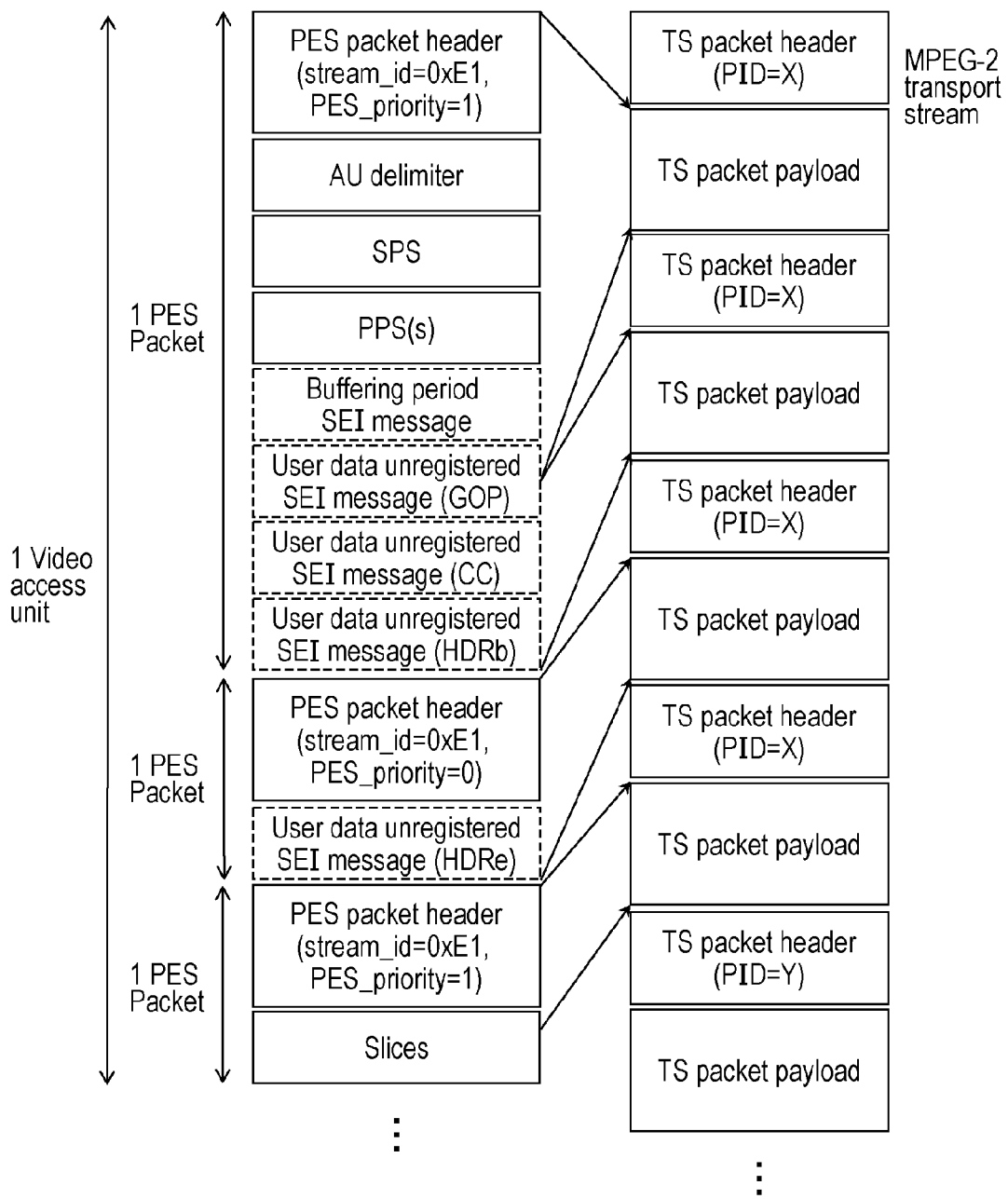
FIG. 34 is a diagram for describing an example of MPEG-2 TS multiplexing of an HDR video stream.

FIG. 34 is a diagram for describing another method for multiplexing an HDR video stream including up to an SEI message (HDRe) by MPEG-2 TS. One picture (one frame or one video access unit) is divided and stored in each of three PES packets, to put the video stream into a PES. Thereafter, each of the three PES packets are divided as necessary, and stored in order in the payload of the TS packets of PID=X.

In the case of the method illustrated in FIG. 34, the HDR video sequence which is two PES packets of stream_id=0xE1 is stored in the TS packets of PID=X. Just the SEI message (HDRe) is stored alone in a TS packet of the same PID=X in the same stream_id=0xE1 but as a PES packet where PES_priority=0.

At the time of outputting HDR video by HDMI (registered trademark), upon the information of the SEI message (HDRe) being transmitted according to the method illustrated in FIG. 34, the PES packet where stream_id=0xE1 and PES_priority=0 is searched from each TS packet of PID=X. Accordingly, the processing for searching for the SEI message (HDRe) is not as light as the method illustrated in FIG. 33.

However, there is little difference between decoding just the HDR video sequence transmitted by TS packets of PID=X and decoding not only the HDR video sequence but the SEI message (HDRe) included as well, so the method illustrated in FIG. 34 is realizable.

Note that the PES_priority value does not have to be this combination; the same effect can be yielded by an arrangement where only the PES packet storing the SEI message (HDRe) has a value of PES_priority=1.

Figure 35:
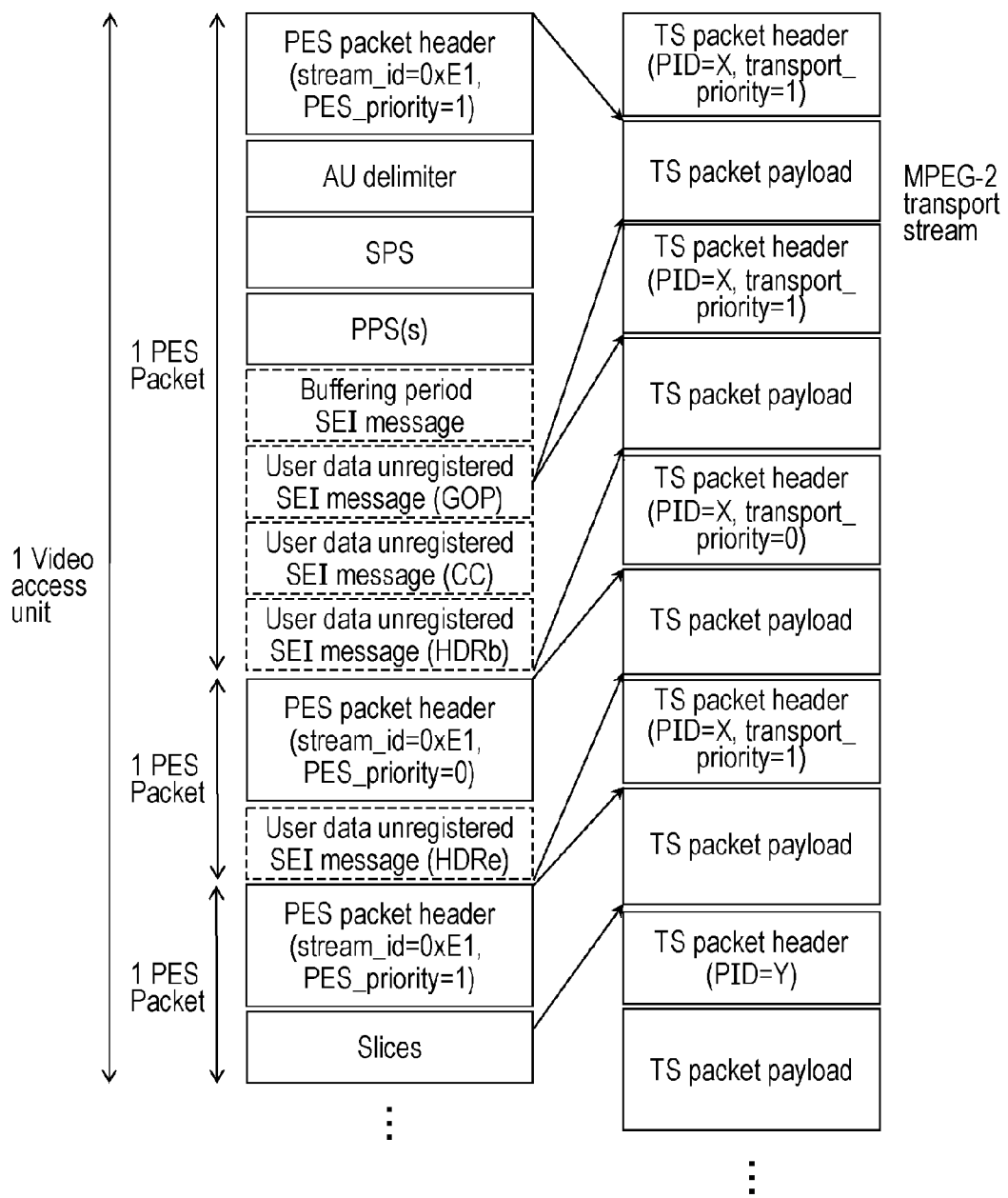
FIG. 35 is a diagram for describing an example of MPEG-2 TS multiplexing of an HDR video stream.

FIG. 35 is a diagram for describing another method for multiplexing an HDR video stream including up to an SEI message (HDRe) by MPEG-2 TS. The difference as to the method illustrated in FIG. 34 is that the transport_priority of the TS packet storing the PES packet containing the SEI message (HDRe) is 0 in the method illustrated in FIG. 35.

At the time of outputting HDR video by HDMI (registered trademark), upon the information of the SEI message (HDRe) being transmitted according to the method illustrated in FIG. 35, the SEI message (HDRe) is analyzed from the TS packet where PID=X and transport_priority=0. Accordingly, the amount of processing to search for the SEI message (HDRe) is light in the same way as the method illustrated in FIG. 33, so the method illustrated in FIG. 35 is realizable.

Also, in this case, there is little difference in the T-STD model between decoding just the HDR video sequence and decoding not only the HDR video sequence but also the SEI message (HDRe) included as well, so the method illustrated in FIG. 35 is realizable. For example, the PID demultiplexer of the TS decoder separates the stream based on the transport_priority value. Accordingly, a decoder that is not compatible with SEI message (HDRe) and performs high-luminance-izing using information up to the SEI message (HDRb) can easily discard the TS packet including the SEI message (HDRe) by the aforementioned PID demultiplexer.

Note that the transport_priority value does not have to be this combination; the same effect can be yielded by an arrangement where only the TS packet storing the SEI message (HDRe) has a value of transport_priority=1.

Figure 36:
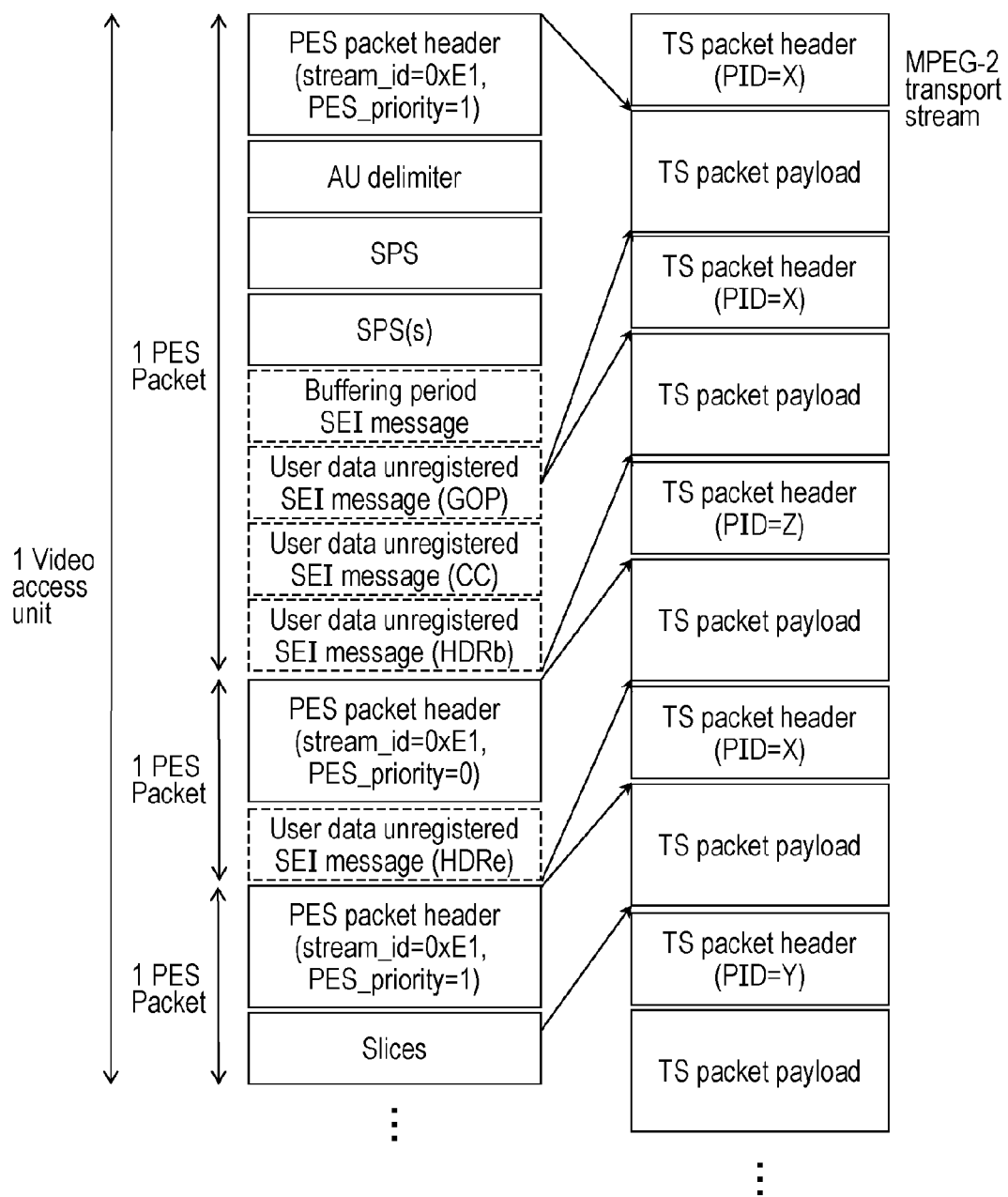
FIG. 36 is a diagram for describing an example of MPEG-2 TS multiplexing of an HDR video stream.

FIG. 36 is a diagram for describing another method for multiplexing an HDR video stream including up to an SEI message (HDRe) by MPEG-2 TS. The method illustrated in FIG. 36 uses two types of PID as in the method illustrated in FIG. 33, and configures the PES packets as in the method illustrated in FIGS. 34 and 35. This method illustrated in FIG. 36 has both the same advantages and disadvantages as the method illustrated in FIG. 33.

Figure 37:
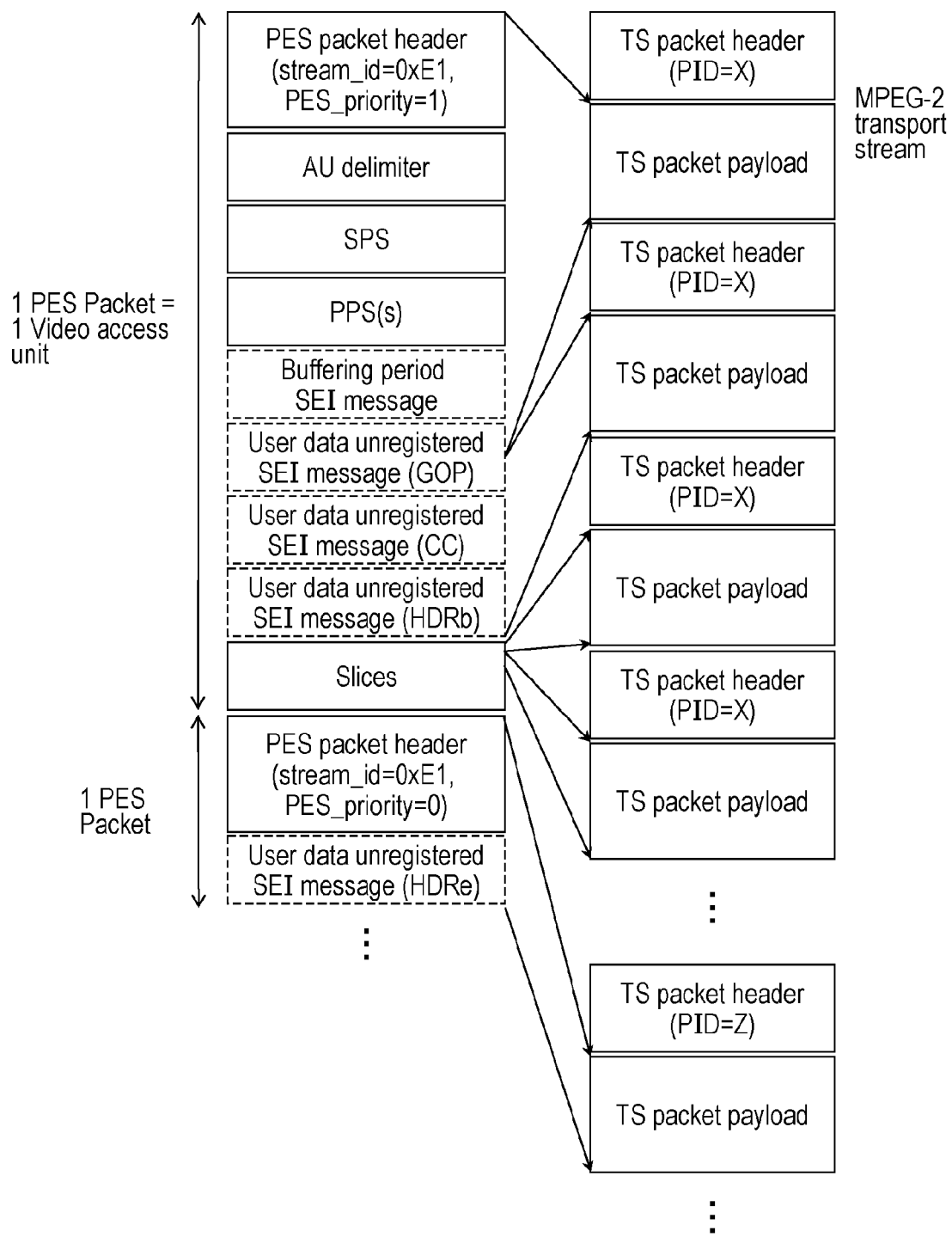
FIG. 37 is a diagram for describing an example of MPEG-2 TS multiplexing of an HDR video stream.

FIG. 37 is a diagram for describing another method for multiplexing an HDR video stream including up to an SEI message (HDRe) by MPEG-2 TS. The method illustrated in FIG. 37 stores the SEI message (HDRe) in a PES packet where PES_priority=0, which is a separate PES packet from the PES packet storing the SEI message (HDRb) and so forth. After storing of the slice NAL units, the PES packet where PES_priority=0 is multiplexed at another TS packet where PID=Z, separate from the TS packet where PID=X. The position of multiplexing of the SEI message (HDRe) is immediately after the picture data. Accordingly, the method illustrated in FIG. 37 stores the HDR video sequence up to the SEI message (HDRb) in one PES packet. Other than this point, the method illustrated in FIG. 37 has both the same advantages and disadvantages as the method illustrated in FIG. 33.

Figure 38:
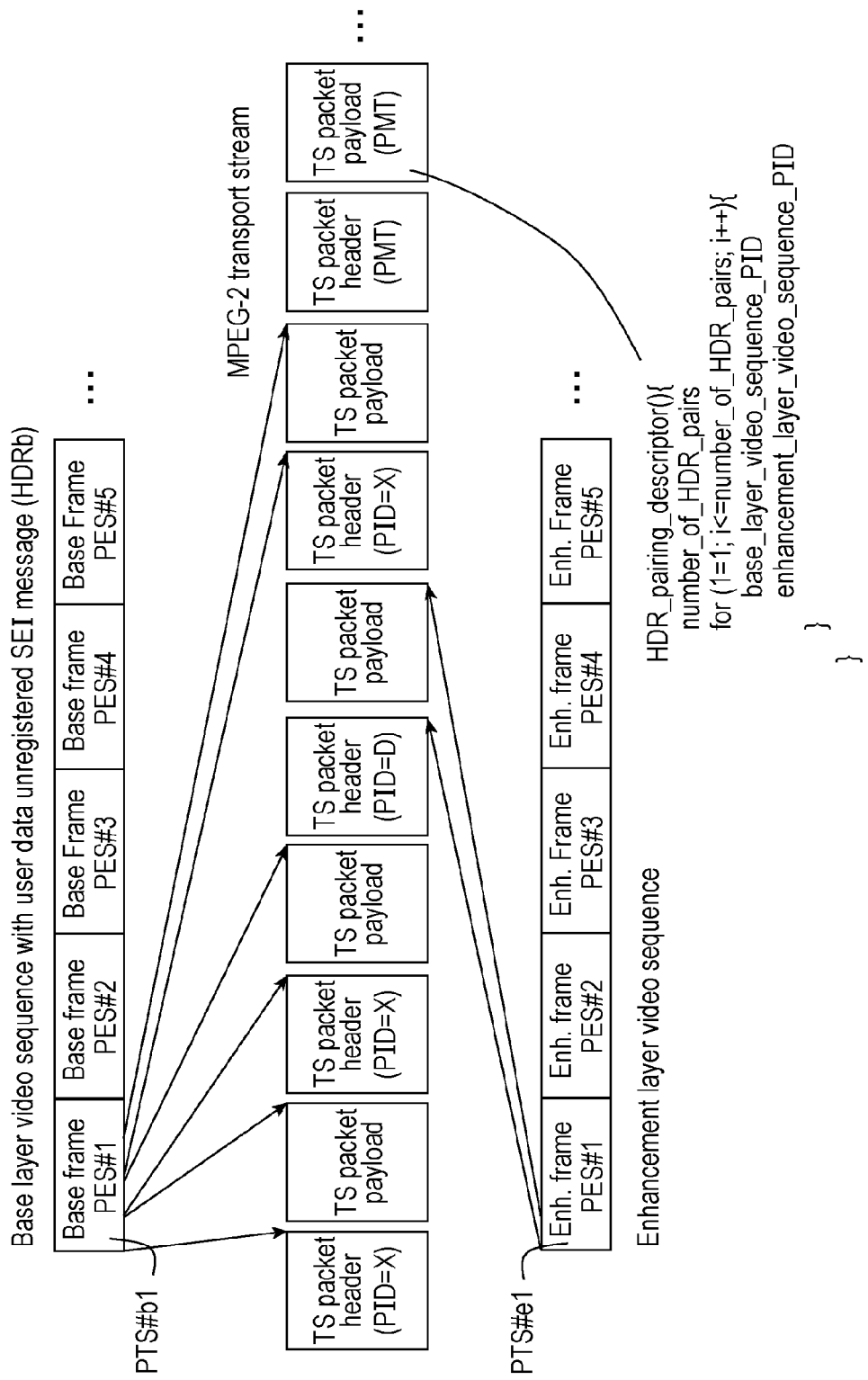
FIG. 38 is a diagram for describing an example of MPEG-2 TS multiplexing of an HDR video stream.

FIG. 38 is a diagram for describing a method for multiplexing an enhanced video sequence, which is a different video sequence from an HDR video sequence, by MPEG-2 TS, instead of an SEI message (HDRe). The method illustrated in FIG. 38 transmits an enhanced video sequence (Enhancement layer video sequence) as enhancement video information regarding an HDR video sequence (Base layer video sequence with user data unregistered SEI message (HDRb)), instead of transmitting high-luminance enhancement metadata by SEI message (HDRe).

For example, an enhanced picture of Enhancement frame PES#n included in the enhanced video sequence is added to the base picture of Base frame PES#n included in the above-described HDR video sequence. Accordingly, high-luminance enhancement of the HDR video sequence can be performed more accurately while using even more data than the SEI message.

Corresponding pictures may be correlated with each other by having the same PTS. For example, correlation indicating that "PTS#b1 of base picture"="PTS#e1 of enhanced picture" is illustrated.

The above-described base video sequence and enhanced video sequence are multiplied in the MPEG-2 TS as two entirely different video sequences in PES packets with different PIDs. In order to correctly specify the pair of the base video sequence and enhanced video sequence, the PMT packet may express the pair using descriptor( ). For example, this method illustrated in FIG. 38 describes HDR_pairing_descriptor( ) in the PMT packet. The HDR_pairing_descriptor( ) contains the number of pairs in this MPEG-2 TS (number_of_HDR_pairs), and the PID values that the base video sequence and enhanced video sequence use, for each pair. The PID value used by the base video sequence is indicated by base_layer_video_sequence_PID, and the PID value used by the enhanced video sequence is indicated by enhancement_layer_video_sequence_PID. Describing the HDR_pairing_descriptor( ) in this way enables a correct combination of pairs to be indicated.

Figure 39:
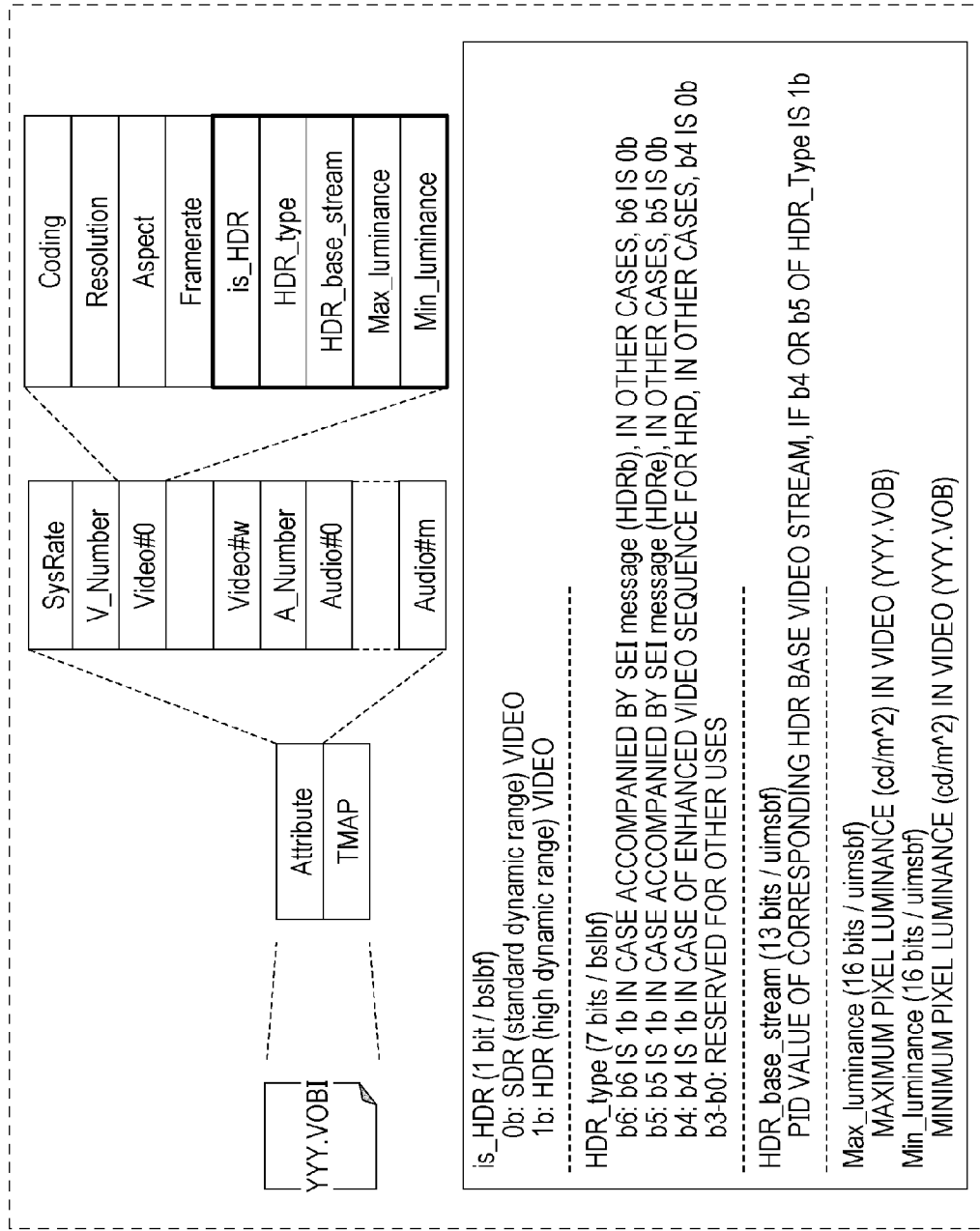
FIG. 39 is a diagram for describing management information of an HDR video stream.

FIG. 39 is a diagram for describing attribute information in a case of managing an HDR video stream by YYY.VOBI, which is management information of a video stream (YYY.VOB). A number of attributes of Video, that is equal to the number of video streams included in YYY.VOB (V_Number), is recorded in "Attribute" of YYY.VOBI as video attribute information. Video attribute information in one video stream includes not only coding method (Coding), spatial resolution (Resolution), aspect ratio (Aspect), and frame rate (Framerate), but also the following attribute information.

Attribute information is_HDR is information for identifying whether the video stream corresponding to this attribute information is an HDR video stream, or an SDR (Standard Dynamic Range) video stream. In a case where description is made in is_HDR that the video stream is an HDR video stream (i.e., in a case where is_HDR=1b), the following attribute information relating to HDR is described.

Attribute information HDR_type indicates the type of video stream corresponding to this attribute information, i.e., the type of HDR. Of the seven bits in the HDR_type, if the lowest 1 bit (b6) is 1b, this means that the video stream is an HDR video stream including an SEI message (HDRb). In a case where the bit one order higher (b5) is 1b, this means that the video stream is a luminance-enhanced HDR video stream including an SEI message (HDRe). In a case where the bit one order higher (b4) is 1 b, this means that the video stream is an enhanced video sequence corresponding to a base video stream that includes an SEI message (HDRb).

Attribute information HDR_base_stream is information that identifies an HDR video stream (base video stream) including a base SEI message (HDRb), in a case where the video stream corresponding to this attribute information is a SEI message (HDRe) luminance-enhanced HDR video stream or an enhanced video sequence. For example, the information indicates the PID value of a TS packet in an HDR video stream (base video stream) including a base SEI message (HDRb). Accordingly, which video stream is the base video stream paired with the video stream corresponding to the attribute information can be known without analyzing the stream, so setting of the PID demultiplexer of the TS decoder can be appropriately performed.

Attribute information Max_luminance represents the pixel luminance value (Y) of the maximum luminance (Max_luminance) of the HDR video stream within the video stream (YYY.VOB) corresponding to the attribute information, and further represents the luminance thereof in units of cd/m^2.

Attribute information Min_luminance represents the pixel luminance value (Y) of the minimum luminance (Min_luminance) of the HDR video stream within the video stream (YYY.VOB) corresponding to the attribute information, and further represents the luminance thereof in units of cd/m^2.

By analyzing this video attribute information, the player, which is the playback device, can determine whether the video stream to be played is HDR or not. Further, if the video stream is HDR, the player can determine what type of the HDR is, i.e., what encoding format the HDR video stream has. The player can also obtain the identification information (PID) of the base HDR video stream corresponding to the video stream to be played, and information indicating luminance range, such as maximum luminance and minimum luminance. Accordingly, HDR video can be played while performing suitable luminance control.

Third Embodiment

Next, a third embodiment will be described. In the same way as in the second embodiment, the third embodiment is content relating to recording or playing high-luminance video information with a BD. The third embodiment is basically based on the first and second embodiments, so the following description will be made primarily with regard to portions that are expanded in the third embodiment or portions that are different.

Figure 40:
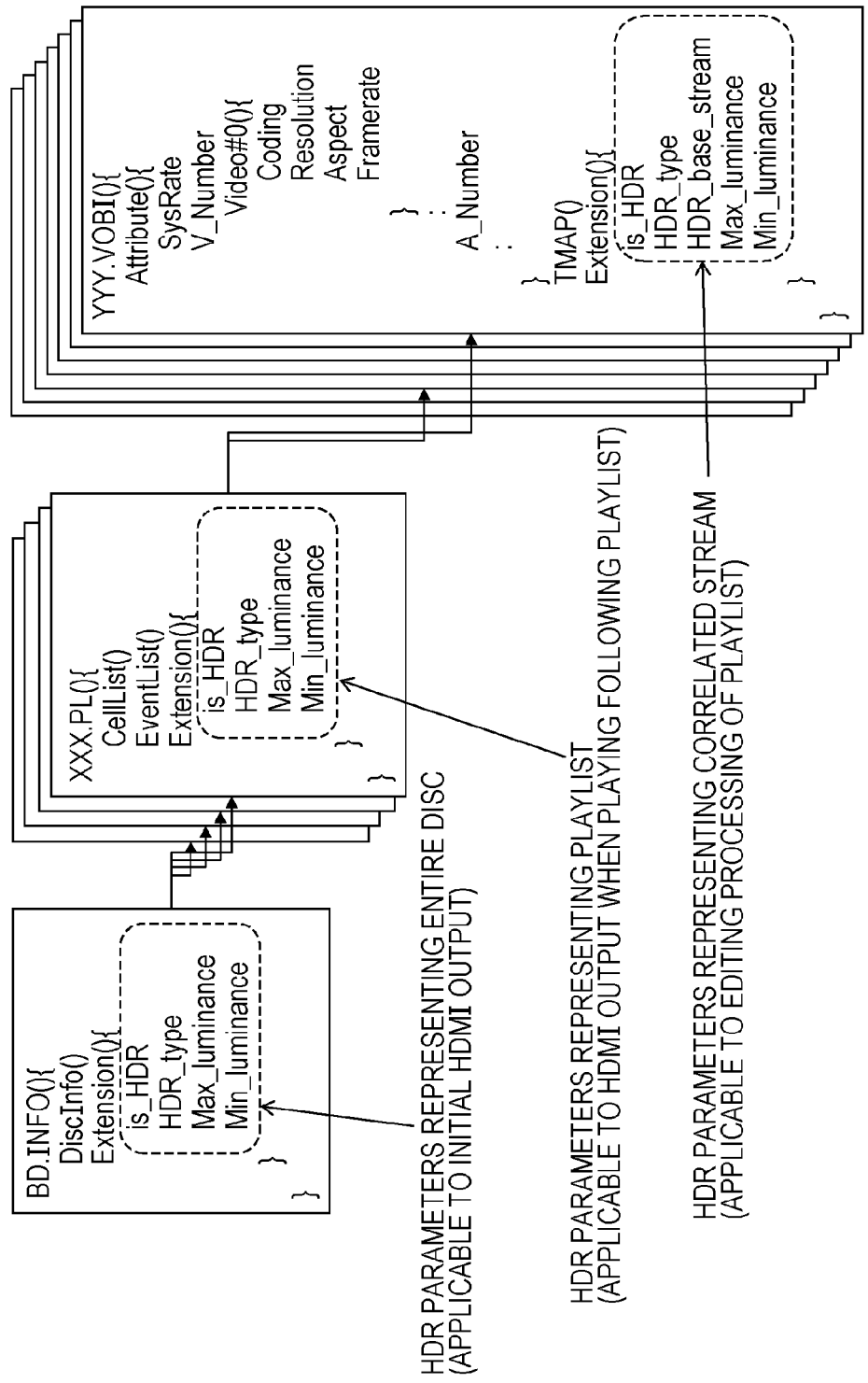
FIG. 40 is a diagram for describing management information of an HDR video stream and the content thereof.

FIG. 40 is a diagram for describing the relationship among management information (management information files) described in FIG. 5 and so forth, and the contents of description thereof.

The BD.INFO file is an management information file indicating attributes relating to the entire BD, which is a recording medium. The BD.INFO file includes DiscInfo( ) describing representative attribute information of the entire disc, and Extension( ) describing extension data. Attribute information such as is_HDR, HDR_type, Max/Min_luminance, and so forth, are included in Extension( ), as HDR parameters.

The is_HDR is attribute information indicating whether or not this disc includes at least one or more PlayList (PlayList file) having is_HDR=1b and/or VOBI file having is_HDR=1b. More specifically, is_HDR is attribute information indicating attributes of an initial video stream first played, out of the at least one video streams recorded in the BD that is the recording medium, when the BD is inserted into the playback device. That is to say, is_HDR indicates whether the dynamic range of the luminance of the initial video stream is a first dynamic range (SDR) or a second dynamic range (HDR) broader than the first dynamic range. The player can easily identify from this attribute information whether or not the disc is a disc including an HDR video stream. Accordingly, if this is_HDR=1b at the time of the player outputting a first disc playback screen to a television by HDMI (registered trademark) or the like, the player can perform processing such as starting transmission with signals indicating high-luminance video (HDR) attached.

HDR_type is attribute information indicating the type of the HDR video streams recorded in this disc. That is to say, this is attribute information indicating whether or not each of predetermined multiple types of video streams relating to dynamic range of luminance, are in at least one video stream recorded in the BD. Specifically, if there is one or more PlayList file of which one bit (b6) in HDR_type satisfies the condition of 1b, and/or VOBI file satisfying that condition, in this disc, the lowest order one bit (b6) in HDR_type of the BD.INFO file is set to 1b; otherwise, 0b is set. If there is one or more PlayList file of which one bit (b5) in HDR_type satisfies the condition of 1b, and/or VOBI file satisfying that condition, in this disc, the one bit (b5) that is one higher in HDR_type of the BD.INFO file is set to 1b; otherwise, 0b is set. If there is one or more PlayList file of which one bit (b4) in HDR_type satisfies the condition of 1b, and/or VOBI file satisfying that condition, in this disc, the one bit (b4) that is one more higher in HDR_type of the BD.INFO file is set to 1b; otherwise, 0b is set.

Max/Min_luminance is attribute information indicating the maximum/minimum luminance of the HDR video streams recorded in this disc. The highest value of the Max_luminance values described in all PlayList files and/or VOBI files in this disc is described in Max_luminance. The lowest value of the Min_luminance values described in all PlayList files and/or VOBI files in this disc is described in Min_luminance.

The player can determine whether or not the disc to be played includes an HDR video stream, by analyzing each of the above-described attribute information of the BD.INFO file. Further, the player can determine what sort of encoding format the HDR video stream is of if the disc includes an HDR video stream, and moreover, can obtain information of maximum/minimum luminance and so forth of the entire disc, and so forth. Accordingly, the HDR video stream can be played while performing suitable luminance control processing.

XXX.PL file is a PlayList, and Extension( ) describing extension data of the PlayList is included in this XXX. PL file in addition to the above-described information. Extension( ) includes attribute information such as is_HDR, HDR_type, Max/Min_luminance, and so forth, as HDR parameters.

The is_HDR is attribute information indicating whether or not this PlayList references at least one or more VOBI file having is_HDR=1b. According to this attribute information, the player can easily identify whether or not this PlayList includes an HDR video stream. Accordingly, if this is_HDR=1b at the time of the player displaying a playback screen of a PlayList to a television by HDMI (registered trademark) or the like, the player can perform processing such as starting transmission with signals indicating high-luminance video (HDR) attached.

HDR_type is attribute information indicating the type of the HDR video streams this PlayList references. If this PlayList references one or more VOBI of which one bit (b6) in HDR_type satisfies the condition of 1b, the lowest order one bit (b6) in HDR_type of the PlayList is set to 1b; otherwise, 0b is set. If this PlayList references one or more VOBI of which one bit (b5) in HDR_type satisfies the condition of 1b, the one bit (b5) that is one higher in HDR_type of the PlayList is set to 1b; otherwise, 0b is set. If this PlayList references one or more VOBI of which one bit (b4) in HDR_type satisfies the condition of 1b, the one bit (b4) that is one more higher in HDR_type of the PlayList is set to 1b; otherwise, 0b is set.

Max/Min_luminance is attribute information indicating the maximum/minimum luminance of the HDR video streams that this PlayList references. The highest value of the Max_luminance values described in all VOBI files that this PlayList references is described in Max_luminance. The lowest value of the Min_luminance values described in all VOBI files that this PlayList references is described in Min_luminance.

The player can determine whether or not the PlayList to be played includes an HDR video stream, by analyzing each of the above-described attribute information of the XXX.PL file. Further, the player can determine what sort of encoding format the HDR video stream is of if the PlayList includes an HDR video stream, and moreover, can obtain information of maximum/minimum luminance and so forth of the entire PlayList, and so forth. Accordingly, the HDR video can be played while performing suitable luminance control processing.

The YYY.VOBI file includes Extension( ) describing extension data of the VOBI in addition to the above-described information. Extension( ) includes attribute information equivalent to the attribute information illustrated in FIG. 39, as an HDR parameter.

Providing such attribute information to the VOBI hierarchy enables the player to easily recognize whether or not the video stream is HDR. Also, when generating or editing content, the authoring system that generates disc images, PlayList editing device (recorder) or the like, can easily set values described in the PlayList file, such as is_HDR, HDR_type, HDR_base_stream, Max/Min_luminance, and so forth, from the VOBI file, without analyzing the video stream.

Storing the above-described attribute information in this way in the hierarchical levels in a database file enables the primary parameters (HDR parameters) relating to HDR to be determined for each hierarchical increment (e.g., three hierarchical levels of disc, playlist, and stream). As a result, advantages can be expected such as using these primary parameters for playback control or picture rendering for each player, preventing streams from being analyzed at the time of editing processing, and so forth.

In this way, the BD according to the present embodiment has recorded therein at least one video stream that is encoded video information, and a BD.INFO file indicating attributes relating to the entire BD. The BD.INFO file includes is_HDR that indicates whether the dynamic range of luminance of the initial video stream, of the at least one video stream, played first when the BD is inserted into the playback device, is SDR, or is HDR that is broader than SDR.

Accordingly, referencing the is_HDR in the BD.INFO file enables easy determination of whether the dynamic range of luminance of the initial video stream is SDR or HDR, without analyzing the initial video stream. Thus, when the BD is inserted into the playback device, the playback device references the is_HDR in the BD.INFO file, which enables negotiation based on HDMI (registered trademark) to be speedily performed with a display such as a television or the like, and the initial video stream to be played. In this way, video streams and be efficiently recorded and managed, even in cases where there are various forms for expressing the luminance of video streams.

Also, the BD according to the present embodiment has recorded therein at least one video stream that is encoded video information, and a BD.INFO file indicating attributes relating to the entire BD. The BD.INFO file includes HDR_type indicating whether or not at least one each of multiple types of predetermined video streams, relating to dynamic range of luminance, is recorded.

Accordingly, referencing the HDR_type in the BD.INFO file enables easy determination of what types of video streams are corded in the BD. That is to say, determination can be made without analyzing the video streams recorded in the BD. For example determination can be easily made regarding whether or not an SDR video stream, a video stream including an SEI message (HDRb), a video stream including an SEI message (HDRe), and an enhanced video stream, are recorded in the BD. Thus, the playback device references the HDR_type in the BD.INFO file, which enables negotiation based on HDMI (registered trademark) to be speedily performed with a display such as a television or the like, and the video streams stored in the BD to be played. In this way, video streams can be efficiently recorded and managed, even in cases where there are various forms for expressing the luminance of video streams.

Figure 41:
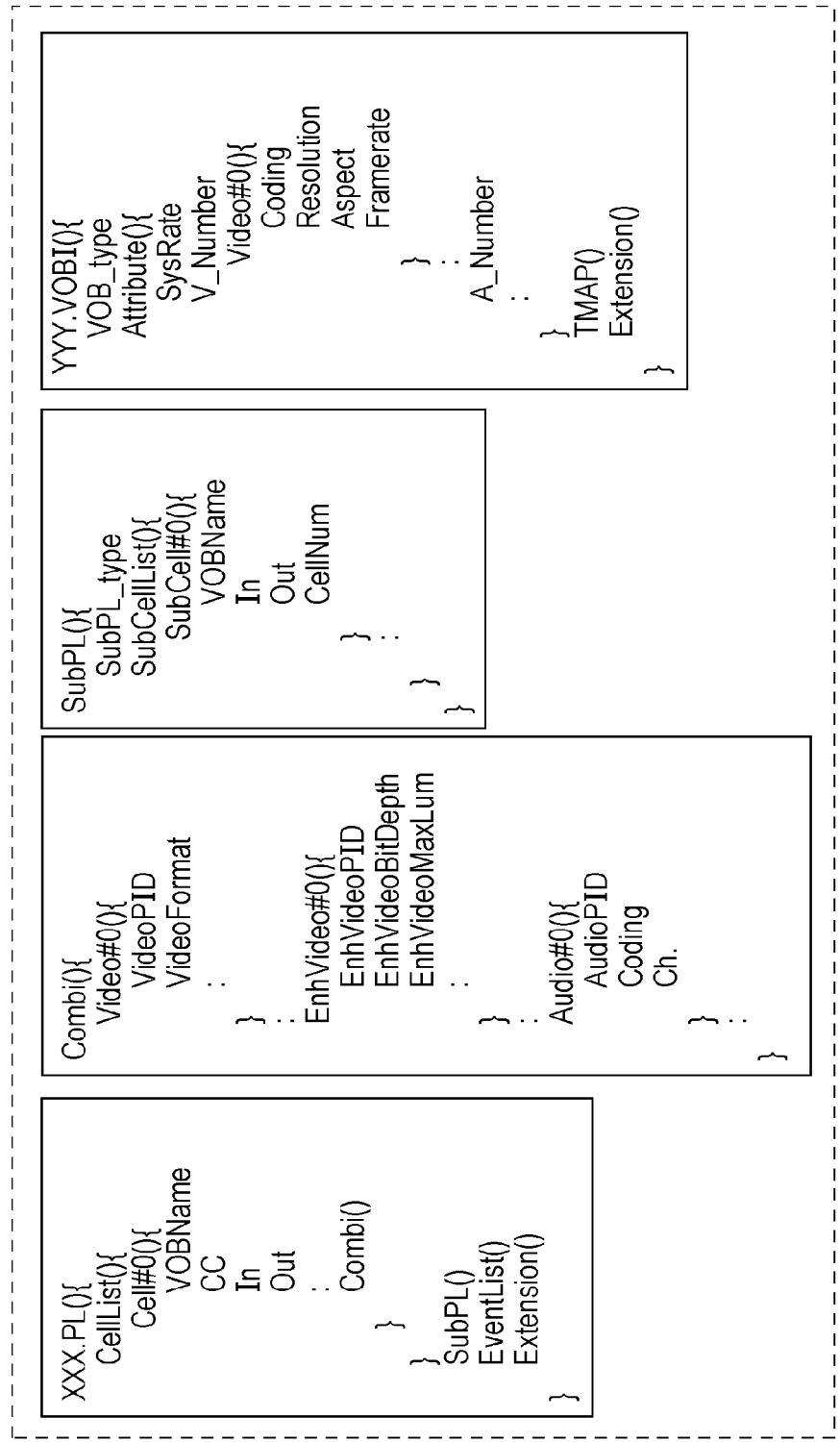
FIG. 41 is a diagram for describing management information of an HDR video stream and the content thereof.

FIG. 41 is a diagram for describing details of each of PlayList and VOBI, which are management information files. A PlayList includes CellList information (hereinafter referred to simply as CellList) and SubPL information (hereinafter referred to simply as SubPL), as illustrated in FIG. 41.

CellList is information bundling multiple Cell information (hereinafter referred to simply as Cell). A Cell is information indicating one playback section of a video stream. Cell includes the filename of a VOB file that this Cell references (VOBName), Closed Captioning information (CC), Cell start time information (In), Cell end time information (Out), and attribute information of elementary streams permitted to be played in combination in this Cell (Combi). That is to say, if a video stream to be played is a base video stream (HDR video stream (HDRb)), the CellList in the PlayList describes the playback path of that base video stream.

Combi describes various types of information, for each elementary stream regarding which playback combination in this Cell is permitted. If a permitted elementary stream is a video stream, identifying information of the video such as a PID (VideoPID), encoding attribute information such as resolution, aspect, etc. (VideoFormat), and so forth, are described.

If the permitted elementary stream is an enhanced video sequence (Enhancement layer video sequence) such as illustrated in FIG. 38, identifying information of the enhanced video sequence such as a PID (EnhVideoPID), bit depth information (EnhVideoBitDepth), maximum luminance information (EnhVideoMaxLum), and so forth. In the following, an enhanced video sequence is described as an enhanced video stream. An enhanced video stream is a stream to enhance the luminance of the base video stream 'HDR video stream (HDRb)).

SubPL is information specifying an additional sub-playback path, and for example is information specifying an enhanced video stream to be played in combination with an HDR video stream. That is to say, this SubPL has described therein a playback path of an enhanced video stream, so as to be played at the same time as the above-described base video stream.

SubPL_type is information indicating the type of playback method of the HDR video stream and enhanced video stream. This information is used to identify synchronous/asynchronous, or the number of streams being used (one or two), or the like.

Specifically, SubPL_type=0x0A (Synchronous Enhancement Layer Video SubPL in Sub TS) means that two system stream files (MPEG-2 TS) are used to read out the HDR video stream and enhanced video stream, and to play synchronously. The meaning of being synchronous is that there is a fixed relationship where a certain picture in the HDR video stream is always and only played synchronously with a certain picture in the enhanced video stream.

SubPL_type=0x0B (Synchronous Enhancement Layer Video SubPL in Main TS) means that an HDR video stream and enhanced video stream in a single MPEG-2 TS are played synchronously.

SubCellList included in SubPL is information bundling multiple SubCell information (hereinafter referred to simply as SubCell). SubCell includes the filename of a VOB file (VOBName) that one continuous section (SubCell) included in the enhanced video stream references, the start time of the SubCell (In), the end time of the SubCell (Out), and identification information of a Cell played at the same time (CellNum). Using SubPL in this way enables the player to be instructed regarding what sort of playback model and which file to use to play the HDR video stream (HDRb) and enhanced video stream (Enhancement Layer Video Stream).

In addition to the above-described information, a YYY.VOBI file has VOB_type information added. VOB_type information indicates what sort of usage this system stream (VOB) is used in. Specifically, VOB_type=0x01 (Main TS for movie application) indicates a VOB (MPEG-2 TS stream) used for normal video playback such as movies and the like. VOB_type=0x10 (Sub TS for Enhancement layer video stream) indicates a VOB (MPEG-2 TS stream) where an enhanced video stream has been multiplexed, that is only usable by SubPL.

In this way, a BD according to the present embodiment has recorded therein an HDR video stream (HDRb) that is encoded video information, an enhanced video stream that is encoded video information and is for enhancing luminance of the HDR video stream (HDRb), and a PlayList file describing the playback path of the HDR video stream (HDRb). The PlayList file further describes the playback path of the enhanced video stream, so as to be played at the same time as the HDR video stream (HDRb).

Accordingly, not only the playback path of the HDR video stream (HDRb) but also the playback path of the enhanced video stream described as SubPL can also be easily identified by referencing the PlayList file. Therefore, the playback device can easily and appropriately multiplex the enhanced video stream on the HDR video stream (HDRb) by referencing the management information file, and consequently can appropriately play video information having a wide dynamic range. In this way, video streams can be efficiently recorded and manages even in cases where there are various forms for expressing luminance of video streams.

Figure 42:
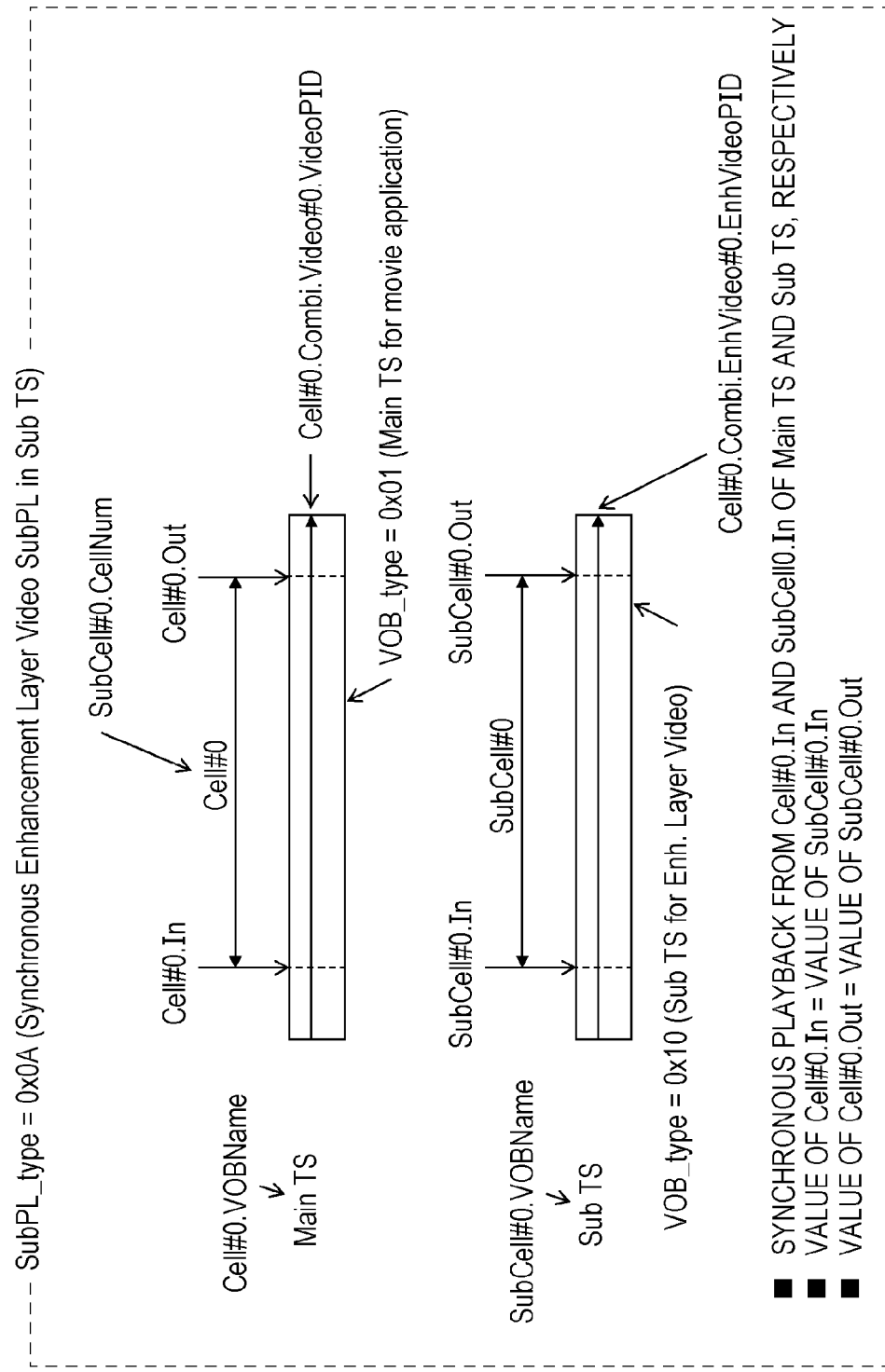
FIG. 42 is a diagram for describing synchronous playback of an HDR video stream and an enhanced video stream thereof.

FIG. 42 is a diagram for describing the meaning of each of the fields in management information in a case where SubPL_type=0x0A. In the SubPL_type=0x0A playback model, two system stream files (MPEG-2 TS) are used to read out at the same time the HDR video stream (HDRb) from the Main TS and the enhanced video stream thereof (Enh. Layer Video) from the Sub TS, and play.

A playback section from Cell#0.In to Cell#0.Out in the HDR video stream (HDRb) is played as the playback section specified in Cell#0. Synchronously with this playback, a continuous section from SubCell#0.In to SubCell#0.Out in the enhanced video stream is played as the continuous section specified in SubCell#0. Accordingly, high-luminance video information that has higher luminance and higher quantization precision that the HDR video stream (HDRb) decoded at a decoder 401 illustrated in FIG. 44, which will be described later, is output.

In the SubPL_type=0x0A playback model, two video streams are played synchronously, so Cell#0.In and SubCell#0.In are the same, and Cell#0.Out and SubCell#0.Out are the same. Note that Cell#0.In, Cell#0.Out, SubCell#0.In and SubCell#0.Out are each points-in-time expressed by a PTS time axis. VOB_type=0x10 (Sub TS for Enh. Layer Video) is only used for the playback mode of this SubPL_type=0x0A (Synchronous Enhancement Layer Video SubPL in Sub TS).

Figure 43:
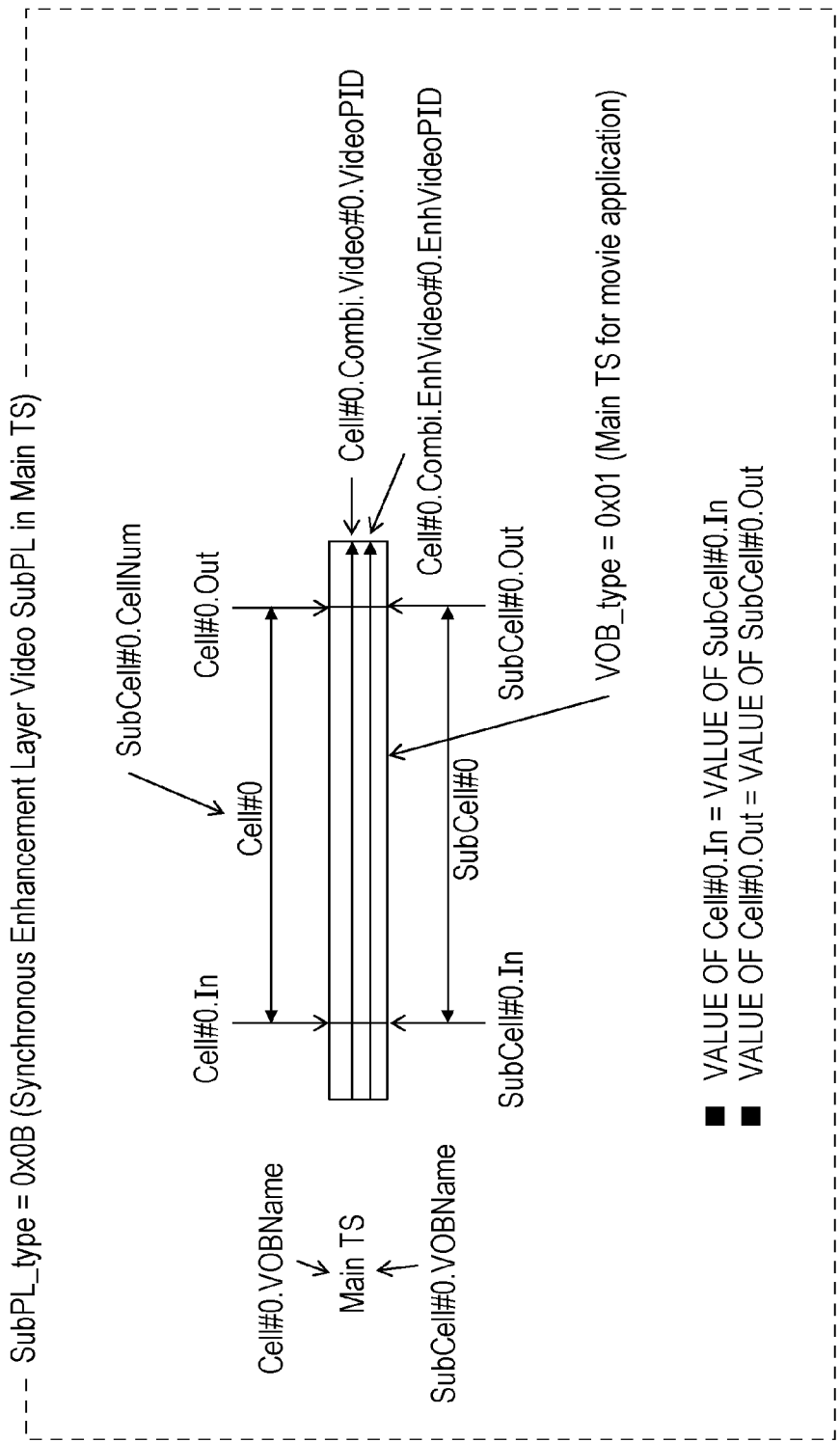
FIG. 43 is a diagram for describing synchronous playback of an HDR video stream and an enhanced video stream thereof.

FIG. 43 is a diagram for describing the meaning of each of the fields in management information in a case where SubPL_type=0x0B. In the SubPL_type=0x0B playback model, the HDR video stream (HDRb) and the enhanced video stream thereof are multiplied in one system stream file (MPEG-2 TS), and these streams are played at the same time. Thus, in the SubPL_type=0x0B model, the base video stream and enhanced video stream are multiplexed in the same transport stream. Accordingly, the base video stream and enhanced video stream can be clearly correlated, and video information having a wide dynamic range can be played in an appropriate manner.

Playback section from Cell#0.In to Cell#0.Out in the HDR video stream (HDRb) is played as the playback section specified in Cell#0. Synchronously with this playback, the continuous section from SubCell#0.In to SubCell#0.Out in the enhanced video stream is played as the continuous section specified in SubCell#0. Accordingly, high-luminance video information that has higher luminance and higher quantization precision that the HDR video stream (HDRb) decoded at the decoder 401 illustrated in FIG. 44, which will be described later, is output.

Thus, in the SubPL_type=0x0B playback model, two video streams are multiplexed in the same system stream file (Main TS that is MPEG-2 TS), and are played synchronously. Accordingly, Cell#0.In and SubCell#0.In are the same, and Cell#0.Out and SubCell#0.Out are the same. That is to say, The PlayList that is a management information file stores a first section included in the playback path of the base video stream, and a second section included in the playback path of the enhanced video stream, mutually correlated with each other. The playback time of the first second and the second section is the same. Specifically, a playback start time of the first section and a playback start time of the second section, that are the same time as each other, and further a playback end time of the first section and a playback end time of the second section, that are the same time as each other, are described in the PlayList. Accordingly, the base video stream and enhanced video stream can be appropriately synchronized and played.

Figure 44:
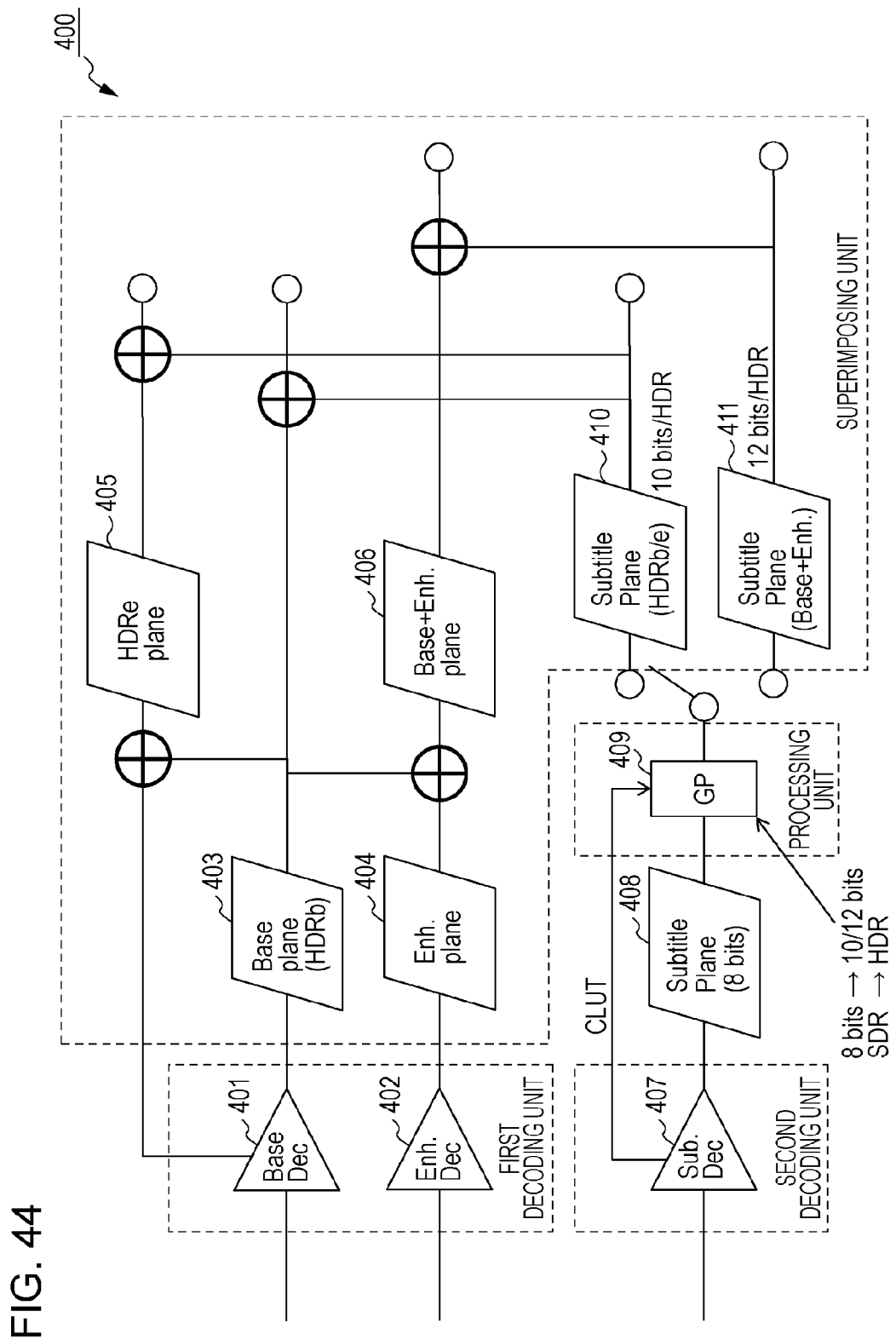
FIG. 44 is a diagram for describing a decoder model of an HDR video stream.

FIG. 44 is a diagram for describing a decoder model of an HDR video stream according to the present embodiment. The playback device according to the present embodiment has a decoder system 400. The decoder system 400 is a video playback unit that reads out, from a BD, video streams such as the base video stream and enhanced video stream, and graphics data indicating subtitles and so forth, and playing, based on the above-described management information files.

The decoder system 400 has a base decoder (Base Dec) 401, an enhanced decoder (Enh. Dec) 402, a base plane (Base plane (HDRb)) 403, an enhanced plane (Enh. plane) 404, an enhanced plane (HDRe plane) 405, a Base+Enh. Plane 406, a subtitle decoder (Sub. Dec) 407, a subtitle plane (Subtitle Plane (8 bit)) 408, a graphics processor (GP) 409, a high-luminance subtitle plane (Subtitle Plane (HDRb/e)) 410, and a high-luminance subtitle plane (Subtitle Plane (Base+Enh.)) 411.

An HDR video stream containing an SEI message (HDRb) is decoded at a base decoder (Base Dec) 401. The high-luminance video information generated by decoding the HDR video stream is rendered at a base plane (Base plane (HDRb)) 403. The basic luminance information (the maximum/minimum luminance values of the overall contents) and so forth included in the SEI message (HDRb) is transmitted along with the high-luminance video information, and output to an external video output I/F such as HDMI (registered trademark).

The decoder system 400 that is a playback device compatible with SEI messages (HDRe) adds luminance enhancement information of the SEI message (HDRe) to the high-luminance video information of the base plane (Base plane (HDRb)) 403, and renders the enhanced high-luminance video information on an HDRe plane 405. The enhanced high-luminance video information, that has had up to this SEI message (HDRe) added is output to an external video output I/F such as HDMI (registered trademark), along with additional luminance information (by maximum luminance value and minimum luminance value in increments of scenes) included in the SEI message (HDRe).

The decoder system 400 that is a playback device compatible with the enhanced video stream described above decodes the enhanced video stream at the enhancement decoder (Enh. Dec) 402. The enhanced video information generated by this decoding is rendered to an enhancement plane (Enh. plane) 404. The decoder system 400 composites this enhanced video information with the high-luminance video information at the base plane (Base plane (HDRb)) 403, so as to composite videos that have the same PTS. The enhanced high-luminance video information obtained by this compositing is rendered to a Base+Enh. Plane 406. The decoder system 400 outputs this enhanced high-luminance video information to an external video output I/F such as HDMI (registered trademark), along with basic luminance information transmitted by the SEI message (HDRb), luminance enhancement information stored in the enhanced video stream, and so forth.

Now, graphics data to be superimposed on the video, e.g., a subtitle stream, is decoded at the subtitle decoder (Sub. Dec) 407, and thereby expressed in 8-bit index color (256 colors). The subtitles that are the decoded subtitle stream are rendered at the subtitle plane (Subtitle Plane (8 bit)) 408. The graphics processor (GP) 409 converts the 8-bit level YCrCb expressing the subtitles into 10-bit level YCrCb, and further converts the luminance of the subtitles from standard luminance to high luminance (matching the high-luminance video information or enhanced high-luminance video information). The high-luminance subtitles, that are subtitles converted to high luminance, are rendered to the high-luminance subtitle plane (Subtitle Plane (HDRb/e)) 410. The high-luminance subtitles rendered to the high-luminance subtitle plane 410 are then composited with the picture of the base plane (Base plane (HDRb)) 403 or enhanced plane (HDRe plane) 405, having the same time, and output.

Also, in a case where there is enhanced high-luminance video information at the Base+Enh. Plane 406, or a SubPL_type=0x0A or 0x0B PlayList being played, the graphics processor (GP) 409 converts the 8-bit level YCrCb expressing the subtitles into 12-bit level YCrCb. Further, the graphics processor (GP) 409 converts the luminance of the subtitles from standard luminance to high luminance (matching the enhanced high-luminance video information generated using the enhanced video stream), for superimposing the subtitles in accordance with the enhanced video stream. The high-luminance subtitles, that are subtitles converted to higher luminance, are rendered to the high-luminance subtitle plane (Subtitle Plane(Base+Enh.)) 411. The high-luminance subtitles rendered to the high-luminance subtitle plane (Subtitle Plane(Base+Enh.)) 411 are then composited with the picture at the Base+Enh. Plane 406, having the same time, and output.

Now, the graphics processor (GP) 409 acquires an index color table (CLUT) for subtitles rendered to the subtitle plane (Subtitle Plane (8 bit)) 408, from the subtitle decoder (Sub. Dec) 407. This index color table (CLUT) indicates whether the video information composited with the subtitles is HDRb/HDRe video information, or enhanced high-luminance video information based on an enhanced video stream. The graphics processor (GP) 409 determines whether to convert the 8-bit level YCrCb into 10-bit level YCrCb or into 12-bit level YCrCb, based on this index color table (CLUT). The graphics processor (GP) 409 then converts the 8-bit level YCrCb in accordance with the determination results.

As described above, the decoder system 400 that is the video playback unit of the present embodiment includes a first decoding unit made up of the base decoder (Base Dec) 401 and enhanced decoder (Enh. Dec) 402, a second decoding unit made up of the subtitle decoder (Sub. Dec) 407, a processing unit made up of the graphics processor (GP) 409, and a superimposing unit including the planes 403 through 406, 410, and 411.

The first decoding unit reads out the base video stream and the enhanced video stream from the BD and decodes these. The second decoding unit reads out encoded graphics data from the BD and decodes it. The processing unit converts color of a predetermined number of levels (8 bits), indicated by the decoded graphics data, into color of a number of levels in accordance with the video plane for superimposing (10 bits or 12 bits). The superimposing unit superimposes the enhanced video stream on the decoded base video stream and stores in a video plane, and further superimposes, upon the video stream stored in the video plane, graphics data expressed by the converted number of levels (10 bits or 12 bits) of color.

Accordingly, the playback device according to the present embodiment can make the color of subtitles, for example indicated by graphics data, to appropriately match the color of wide-dynamic-range video information realized using an enhanced video stream.

It should be noted that the above description is only an example, and that one skilled in the art would be able to make various applications.

In the above embodiments, the components may be realized by a dedicated hardware configuration, or by executing a software program suitable for the components. The components may be realized by a program executing unit such as a CPU or processor reading out and executing a software program recorded in a recording medium such as a hard disk or semiconductor memory or the like.

Although the playback device and playback method according to one or multiple forms has been described by way of embodiments, the present disclosure is not restricted to these embodiments. Embodiments of various modifications conceivable by one skilled in the art, and forms configured by combining components in different embodiments, may be included in the scope of the present disclosure without departing from the essence of the present disclosure.

The present disclosure enables video streams to be efficiently recorded and managed even in a case where there are various forms expressing luminance of video streams, and is applicable to, for example, optical discs such as BDs, playback devices that read and play video streams from the optical discs, and so forth.

What is claimed is:

1. A playback device that reads out and plays contents from a recording medium, the playback device comprising:
    a first decoder that reads out and decodes a base video stream that is encoded video information, and an enhanced video stream that is encoded video information, for enhancing luminance of the base video stream, from the recording medium;
    a second decoder that reads out and decodes encoded graphics data from the recording medium;
    a processor that converts color of a predetermined number of levels indicated by the decoded graphics data, into color of a number of levels in accordance with a video plane that stores a video stream on which the graphics data is to be superimposed; and
    a superimposer that superimposes the decoded enhanced video stream on the decoded base video stream and stores at the video plane, and further superimposes graphics data expressed by color of the converted number of levels on the video stream stored at the video plane.

2. The playback device according to claim 1,
    wherein the processor converts the number of levels on the graphics data from 8 bits to 12 bits.

3. A playback device that reads out and plays contents from a recording medium, the playback device comprising:
    a first decoder that reads out and decodes a base video stream that is encoded video information from the recording medium;
    a second decoder that reads out and decodes encoded graphics data from the recording medium;
    a processor that converts color of a predetermined number of levels indicated by the decoded graphics data, into color of a number of levels in accordance with a video plane that stores a video stream on which the graphics data is to be superimposed; and
    a superimposer that stores the decoded base video stream at the video plane, and superimposes graphics data expressed by color of the converted number of levels on the base video stream stored at the video plane.

4. The playback device according to claim 3,
    wherein the processor converts the number of levels on the graphics data from 8 bits to 10 bits.

5. A playback method of reading out and playing contents from a recording medium, the playback method comprising:
    reading out and decoding a base video stream that is encoded video information, and an enhanced video stream that is encoded video information, for enhancing luminance of the base video stream, from the recording medium;
    reading out and decoding encoded graphics data from the recording medium;
    converting color of a predetermined number of levels indicated by the decoded graphics data, into color of a number of levels in accordance with a video plane that stores a video stream on which the graphics data is to be superimposed; and
    superimposing the decoded enhanced video stream on the decoded base video stream and storing at the video plane, and further superimposing graphics data expressed by color of the converted number of levels on the video stream stored at the video plane.

6. The playback method according to claim 5,
    wherein, in the converting, the number of levels on the graphics data is converted from 8 bits to 12 bits.

7. A playback method of reading out and playing contents from a recording medium, the playback method comprising:
    reading out and decoding a base video stream that is encoded video information from the recording medium;
    reading out and decoding encoded graphics data from the recording medium;
    converting color of a predetermined number of levels indicated by the decoded graphics data, into color of a number of levels in accordance with a video plane that stores a video stream on which the graphics data is to be superimposed; and
    storing the decoded base video stream at the video plane, and superimposing graphics data expressed by color of the converted number of levels on the base video stream stored at the video plane.

8. The playback method according to claim 7,
    wherein, in the converting, the number of levels on the graphics data is converted from 8 bits to 10 bits.

* * * * *